United States Patent [19]
Bridgelall et al.

[11] Patent Number: 5,478,997
[45] Date of Patent: Dec. 26, 1995

[54] SYMBOL SCANNING SYSTEM AND METHOD HAVING ADAPTIVE PATTERN GENERATION

[75] Inventors: Raj Bridgelall, Setauket; David Goren, Rondonkoma; Joseph Katz; Simon Bard, both of Stony Brook, all of N.Y.

[73] Assignee: Symbol Technologies, Inc., Bohemia, N.Y.

[21] Appl. No.: 981,448

[22] Filed: Nov. 25, 1992

Related U.S. Application Data

[63] Continuation-in-part of Ser. No. 897,835, Jun. 12, 1992, which is a continuation-in-part of Ser. No. 506,674, Apr. 9, 1990, abandoned, which is a continuation of Ser. No. 260,692, Oct. 21, 1988, Pat. No. 4,933,538.

[51] Int. Cl.$^6$ ........................................................ G06K 7/10
[52] U.S. Cl. ........................................... 235/462; 235/470
[58] Field of Search ............................. 235/462, 470, 235/472

[56] References Cited

U.S. PATENT DOCUMENTS

| | | | |
|---|---|---|---|
| 3,847,346 | 11/1974 | Dolch | 382/61 |
| 4,360,798 | 11/1982 | Swartz et al. | 340/146.3 |
| 4,387,297 | 6/1983 | Swartz et al. | 235/462 |
| 4,418,276 | 11/1983 | Yatsunami | 235/462 |
| 4,760,248 | 7/1988 | Swartz et al. | 235/472 |
| 4,792,666 | 12/1988 | Cherry et al. | 235/466 |
| 4,800,256 | 1/1989 | Broockman et al. | 235/467 |
| 4,933,538 | 6/1990 | Heiman et al. | 235/462 |
| 5,115,121 | 5/1992 | Bianco et al. | 235/470 |
| 5,132,523 | 7/1992 | Bassett | 235/472 |
| 5,151,581 | 9/1992 | Krichever et al. | 235/470 |
| 5,235,167 | 8/1993 | Dvorkis et al. | 235/472 |

*Primary Examiner*—John Shepperd
*Attorney, Agent, or Firm*—Finnegan, Henderson, Farabow, Garrett & Dunner

[57] ABSTRACT

A symbol scanning system which adaptively changes scanning system parameters including light beam pattern and focus to improve barcode readability. The scanning system including; a scanner, responsive to coordinate control signals, for directing a light beam in a pattern at a symbol at a predetermined location, detecting a reflected portion of the light beam, and generating a feedback signal corresponding to the detected portion of the reflected light beam, a microprocessor, responsive to the feedback signal, for generating pattern control signals, and a pattern generator for generating the coordinate control signals in responsive to the pattern control signals and for determining the light beam pattern.

11 Claims, 32 Drawing Sheets

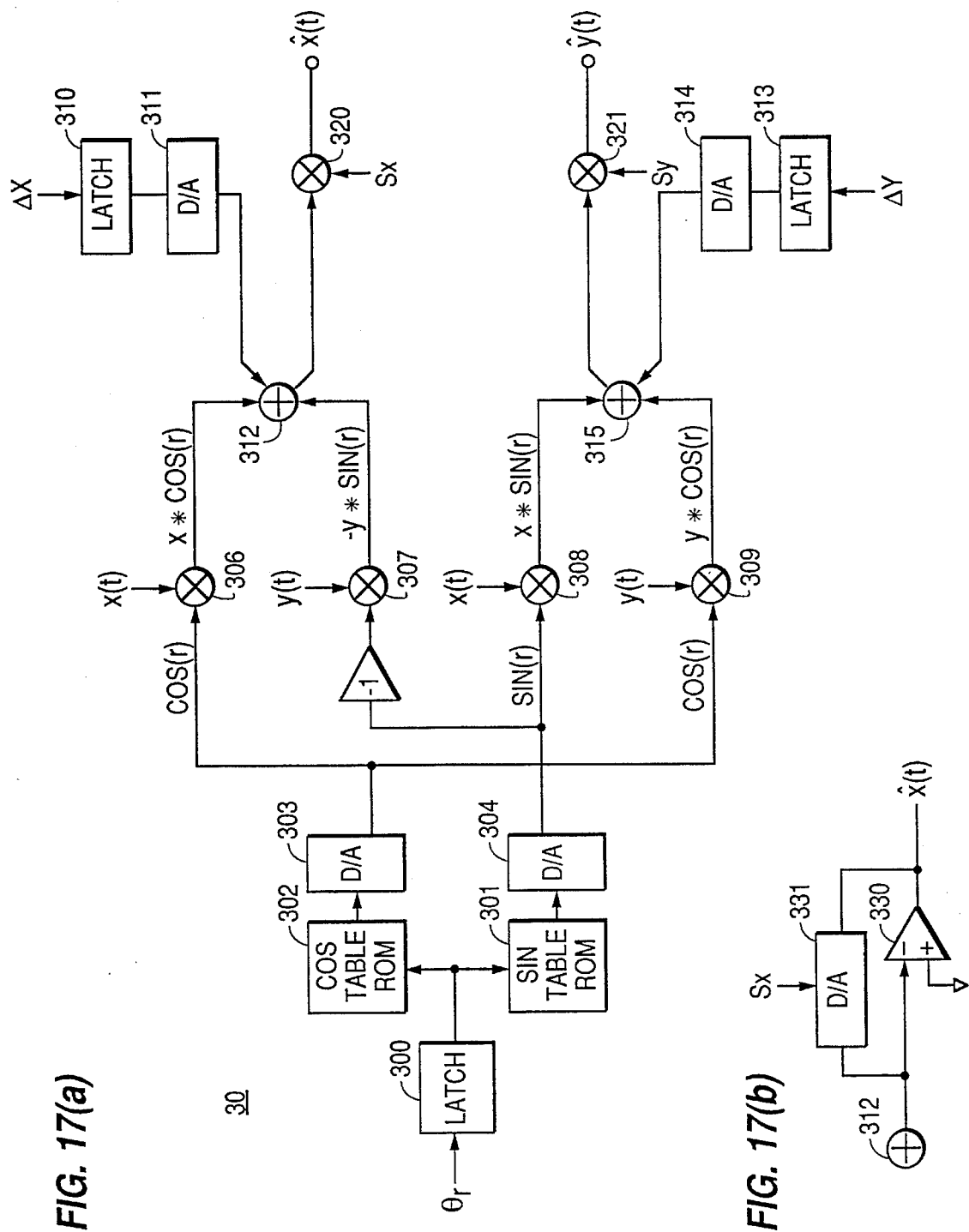

SCANNING RASTER (t = t2)

(t = t2)

(t = t1)

(t = t2)

CCD / CMD POSITION DETECTING SYSTEM

SYMBOL SCANNING SYSTEM AND METHOD HAVING ADAPTIVE PATTERN GENERATION

REFERENCE TO RELATED APPLICATIONS

This application is a continuation-in-part of U.S. patent application Ser. No. 897,835, filed Jun. 12, 1992, which is a continuation-in-part of U.S. patent application Ser. No. 506,674, filed Apr. 9, 1990, now abandoned, which in turn is a continuation of Ser. No. 260,692, filed Oct. 21, 1988, now U.S. Pat. No. 4,933,538. This application is also related to U.S. patent application Ser. No. 562,130, filed Aug. 3, 1990, and U.S. patent application Ser. No. 553,559, filed Jul. 16, 1990. This application is further related to U.S. patent applications Ser. No. 790,627, filed Nov. 12, 1991, which is a divisional of said Ser. No. 562,130; Ser. No. 635,431 filed Dec. 28, 1990; and Ser. No. 715,267, filed Jun. 14, 1991, all of said applications being assigned to Symbol Technologies, Inc.

BACKGROUND OF THE INVENTION

A. Field of the Invention

The present invention relates to scanning systems which "read" indicia, for example, barcode symbols, having parts with different light reflectivities and, in particular, to control circuitry which enables such scanning systems to adaptively alter a light beam pattern in response to feedback signals.

B. Description of the Related Art

Various optical readers and optical scanning systems have previously been developed for reading barcode symbols appearing on a label, or on the surface of an article. The barcode symbol itself is a coded pattern of indicia. Generally, scanning systems electro-optically transform the graphic indicia of the symbols into electrical signals which are decoded into alphanumeric characters. The resulting characters describe the article and/or some characteristic of the article to which the symbol is attached. Such characters typically comprise input data to a data processing system for applications in point-of-sale processing, inventory control, and the like.

As used in this specification and in the following claims, the terms "symbol," "barcode," and "barcode symbol" are used to denote a pattern of variable-width bars separated by variable-width spaces. The foregoing terms are intended to be broadly construed to cover many specific forms of one- and two-dimensional patterns including alpha-numeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated together to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in U.S. patent application Ser. No. 07/461,881 filed Jan. 5, 1990, commonly assigned to the assignee of the present invention, and hereby incorporated by reference.

Scanning systems have been disclosed, for example, in U.S. Pat. Nos. 4,251,798; 4,369,361; 4,387,297; 4,409,470; 4,760,248; 4,896,026, all of which have been assigned to the assignee of the present invention. As disclosed in some of the above patents, and particularly in U.S. Pat. No. 4,409,470, one existing scanning system comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically manipulated, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered from the symbol. The photodetector or sensor is positioned in the scanner in an optical path so that it has a field of view which extends at least across and slightly beyond the boundaries of the symbol. A portion of the light beam reflected from the symbol is detected and converted into an analog electrical signal.

The analog electrical signal produced by the photodetector is converted by a digitizer circuit in the scanner into a pulse-width modulated digital signal having widths corresponding to the physical widths of the symbol elements. Conventional digitizers include a positive edge detector which sets a "one-shot" circuit having a predetermined time constant, and a negative edge detector which resets the "one-shot" circuit. Some conventional digitizers include circuits for selecting a variable edge detection threshold in an attempt to suppress noise triggered edge detections. Other conventional digitizers incorporate multiple single digitizer circuits in a parallel arrangement to further suppress "false" edge detections caused by noise in the electrical signal. However, each of these conventional digitizer circuits suffers from an unacceptably high rate of edge "falsing" for noisy electrical signals.

The pulse-width modulated digitized signal from the digitizer is decoded, based upon the specific symbology used for the symbol, into a binary data representation of the data encoded in the symbol. The binary data may then be subsequently decoded into the alphanumeric characters represented by the symbol.

The decoding process in conventional scanning systems usually works in the following way. The decoder receives the pulse-width modulated digital signal from the scanner, and an algorithm implemented in software attempts to decode the scan. If the start and stop characters and the characters between them are successfully and completely decoded, the decoding process terminates and an indicator (such as a green light and/or an audible beep) is initiated to inform the user. Otherwise, the decoder receives a next scan, attempts another decode on the scan, and so on, until a completely decoded scan is achieved or no more scans are available.

Overall performance of a scanning system in reading symbols is a function of the optical capabilities of the scanning mechanism in directing a light beam at a target symbol and resolving the reflected light, and a function of the electronic subsystems which convert and process the information contained in the reflected light. A measure of the overall performance of a barcode symbol scanning system is its ability to resolve the narrowest elements of a barcode symbol and its ability to decode symbols located perhaps hundreds of inches away from the scanning system.

One limiting factor in the ability of conventional scanning systems to correctly resolve elements in a barcode symbol is the degree to which conventional digitizers produce false edge detections. As previously mentioned, false edge detections result from noise on the electrical signal representing the received portion of the light beam reflected from the symbol. False edge detections corrupt the pulse-width modulated signal corresponding to the symbol elements, and must be compensated for by rescanning the symbol to obtain a less noisy electrical signal or by employing some form of error detection and correction. Either compensation scheme slows signal processing in the scanning system.

Continuing attempts have been made to design and implement an improved scanning system which has very high overall performance in a wide variety of operational environments. Conventional scanning systems adjust scanning parameters, if at all, on a piecemeal basis. Such adjustments are typically made manually, and often require the intervention of a trained technician. Furthermore, conventional adjustments are made only to a single, independent scanning system parameter such as beam intensity or amplifier gain.

Conventional scanning systems also typically use a preset light beam pattern which takes the form of a repeated linear scan, a standard raster scan, or jittered raster scan. These systems suffer from the disadvantage that laser scanning systems must substantially align light beam pattern scan lines with the rows of a symbol. Although a two-dimensional barcode symbol such as PDF417 allows some deviation in this alignment, the orientation of the scan lines must still be less than a maximum angle relative to the rows of the symbol.

Very fast conventional scanning systems also require the operator to manually align the scan lines with symbol rows, typically by moving the scanning device or the article being scanned in order to improve the chances of reading the symbol. This requirement is particularly impractical where the scanned articles are large or heavy, or in applications where scanning is intended to be automated.

The light beam pattern of a conventional scanning system is usually preset according to an intended mode of scanning. For example, a hand-held scanning system will use an "optimal" handheld light beam pattern. In contrast, a fixed or presentation type scanning system will be preset to a different "optimal" light beam pattern for fixed scanning applications. Since these preset, "mode optimal" light beam patterns can not be easily changed, conventional scanning systems can not be quickly and efficiently switched between scanning modes.

Conventional scanning systems also cannot be efficiently used in applications which require scanning of two or more different symbols. For example, if an article has one-dimensional and two-dimensional symbols attached to it, conventional scanning systems cannot alternatively optimize the light beam pattern to read each symbol efficiently. A series of articles having symbols with different symbologies presents a similar problem to a scanning systems with a preset light beam pattern.

Finally, conventional scanning systems can not be used to "track," or follow a symbol on a moving object.

SUMMARY OF THE INVENTION

Accordingly, it is a goal of the present invention to provide a method and apparatus for adaptively generating a light beam pattern in accordance with one or more feedback signals.

Another goal is to provide a method and apparatus for converting an analog electrical signal representing the received light beam reflected from a symbol into a pulse width modulated signal without false edge detection resulting from noise on the electrical signal.

Another goal is to provide a method and apparatus for tracking, scanning and decoding a symbol attached to a moving object.

Yet another goal is to provide a method and apparatus for efficient alternative scanning and decoding of one- and two-dimensional symbols.

These and other goals may be achieved by using an adaptive scanning system which accepts feedback signals indicative of symbol readability and environmental conditions at a predetermined location proximate the symbol, and which alters a light beam pattern to improve symbol readability in response to the feedback signals. In particular, the foregoing goals may be achieved by an adaptive scanning system, comprising; scanning means, responsive to coordinate control signals, for directing a light beam in a pattern at a predetermined location, detecting a reflected portion of the light beam, and generating a feedback signal corresponding to the detected portion of the reflected light beam, processing means, responsive to the feedback signal, for generating pattern control signals, and pattern generator means for generating the coordinate control signals in responsive to the pattern control signals and for determining the light beam pattern.

A method of scanning symbols according to this invention comprises the steps of; directing a light beam in a pattern at a predetermined location, detecting a reflected portion of the light beam, generating feedback signal corresponding to the reflected light beam portion, adaptively generating coordinate control signals in response to the feedback signal, and changing the light beam pattern in response to the coordinate control signals.

It is to be understood that both the foregoing general description and the following detailed description are exemplary and explanatory, and are not restrictive of the invention as claimed. The accompanying drawings, which are incorporated in and constitute a part of the specification, illustrate embodiments of the present invention and together with the general description, serve to explain the principles of the present invention.

BRIEF DESCRIPTION OF THE DRAWINGS

FIG. 17a is a block diagram illustrating an embodiment of the rotator/translator shown in FIG. 1.

FIG. 17b is a block diagram illustrating an embodiment of a "multiplier" used in the rotator/translator shown in FIG. 17a.

FIG. 19b is a side view cut-away of the schematic block diagram illustrating the embodiment of the X/Y scanning head shown in FIG. 19a.

DESCRIPTION OF THE PREFERRED EMBODIMENTS

A. GENERAL DESCRIPTION

Figure 1:
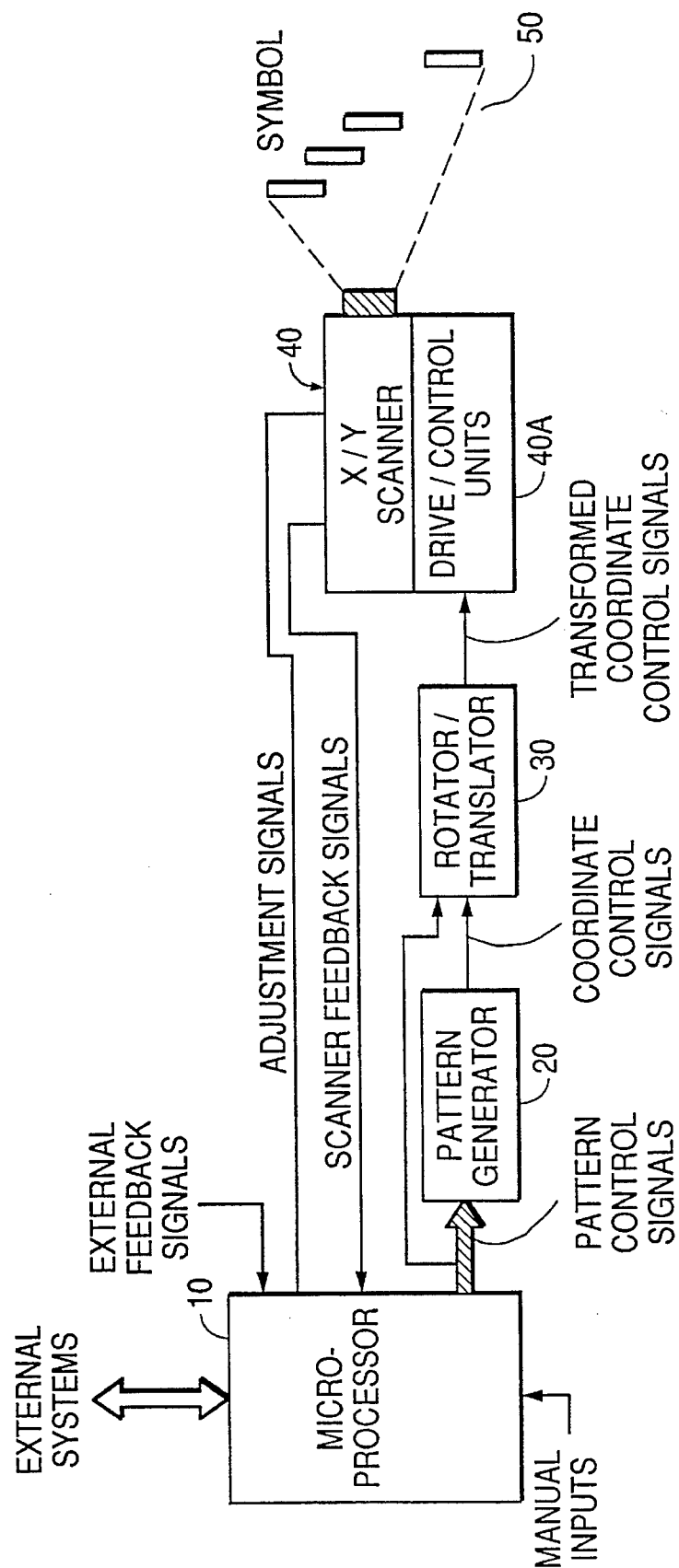
FIG. 1 is a block diagram illustrating an embodiment of a scanning system according to the present invention having an adaptive pattern generator.

An embodiment of the present invention is shown generally in FIG. 1. Symbol 50 is scanned by a light beam generated and directed by general X/Y scanner 40. Symbol 50 may be a one- or two-dimensional barcode symbol as previously described. The embodiment may reside in a hand-held, desk-top workstation, or stationary scanning system as described hereafter.

Scanner 40 directs a light beam at a predetermined location, detects light reflected from symbol 50, and generates feedback signals indicative of light beam scanning efficiencies, symbol readability, position of the symbol and/ or environmental conditions surrounding symbol 50. Feedback signals may include percent decode rate, lighting conditions, mode of scanning (handheld, fixed or presentation), scanning speed, beam focus (for example, a fuzzy logic approach to focusing may be taken) symbology, and symbol density, range, location and orientation. Feedback signals are applied to microprocessor 10 which controls light beam pattern generation and scanner adjustments on the basis of one or more of the feedback signals.

A program running in, or callable by, microprocessor 10 optimizes the operating parameters of scanner 40 to improve symbol scanning efficiency. Among the operating parameters capable of being optimized by microprocessor 10 are scanning beam spot size and/or working distance from the symbol 50. U.S. Pat. No. 4,808,804, commonly assigned to the assignee of the present invention and incorporated by reference herein, is directed to symbol readers with variable spot size and/or working distance. Additionally, among the operating parameters capable of being optimized by microprocessor 10 are light beam intensity and/or single plane scanning angle. U.S. Pat. No. 4,933,538, commonly assigned to the assignee of the present invention and incorporated by reference herein, is directed to scanning systems with adjustable light intensity and/or single plane scanning angle.

In addition to one or more of these operating parameters, the present invention may alter the pattern in which the light beam is generated by scanner 40 and directed at symbol 50. This control process of adaptively altering the light beam pattern in response to feedback signals supplied by scanner 40 or by an external source will be described in detail below. Generally speaking, microprocessor 10 provides pattern control signals to pattern generator 20. Manual inputs from a user interface (not shown) may also be provided to microprocessor 10, and subsequently, or simultaneously, to pattern generator 20. Similarly, external inputs from external systems, such as an interconnected data base, or control computer system, may be provided to microprocessor 10. Manual inputs or external inputs may supplant, override, or modify the pattern control signals generated by microprocessor 10.

In response to pattern control signals generated by microprocessor 10, pattern generator 20 provides a new or modified set of coordinate control signals to scanner 40. The coordinate signals, when applied to the scanner 40, control the optical assembly or scanner control logic such that the pattern of the directed light beam is altered into a new pattern or modified into a variation of the existing pattern.

As shown in FIG. 1, the coordinate control signals may be transformed by a rotator/translator 30 before being applied to scanner 40. By transforming the coordinate control signals, the new light beam pattern may be translated to a new location and/or be rotated to a new angular disposition with respect to the previous light beam pattern. In an embodiment of the present invention comprising a rotator/translator 30, microprocessor 10 provides, as a pattern control signal, a displacement signal to the rotator/translator 30. The displacement signal indicates the relative angular orientation and/or location of a light beam pattern to a previous light beam pattern. Alternatively, the displacement signal may indicate the angular orientation relative to a reference location or to a static reference point. In response to the displacement signal, the rotator/translator 30 modifies or transforms, the coordinate control signals from the pattern generator 20 in order to direct the light beam pattern more accurately at symbol 50.

Each of the foregoing elements, microprocessor 10, pattern generator 20, rotator/translator 30 and scanner 40, will be described in detail below. Each of the elements is discussed as a separate functional entity for purposes of clarity. However, one of ordinary skill in the art will recognize that two or more elements may be combined in a single circuit structure or software routine. For example, a single circuit or software routine may simultaneously perform the functions mentioned above with respect to pattern generator 20 and rotator/translator 30. Following a description of the foregoing elements, various modes of operation, and exemplary feedback signals operative upon the present invention will be described.

Embodiments of the present invention may generally be similar to the style disclosed in U.S. Pat. No. 4,760,248, or in U.S. Pat. No. 4,896,026, both assigned to the assignee of the present invention and may also be similar to a symbol scanning system commercially available as part number LS 8500 or LS 2000 from Symbol Technologies, Inc. Alternatively, or in addition, features of U.S. Pat. No. 4,387,297, or U.S. Pat. No. 4,409,470, both assigned to the assignee of the present invention, may be employed in constructing the scanning system shown in FIG. 2. U.S. Pat. Nos. 4,760,248, 4,896,026 and 4,409,470 are incorporated herein by reference, but the general design of such devices will be briefly described below for completeness.

Figure 2:
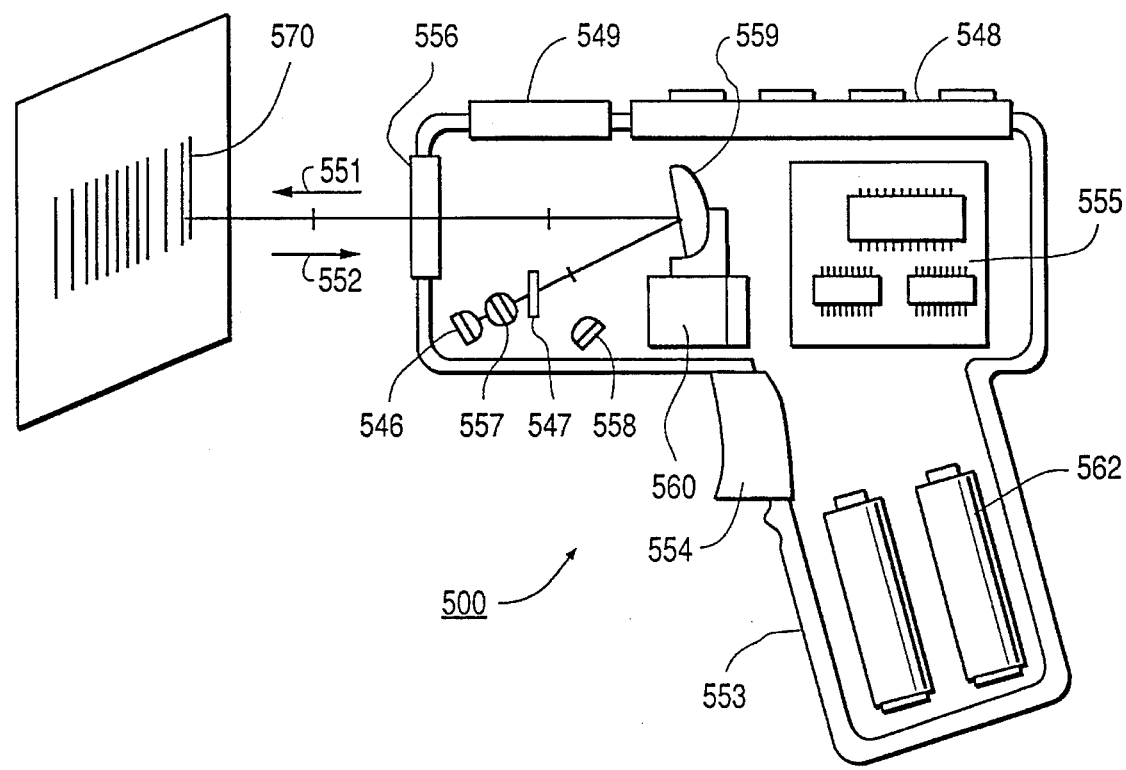
FIG. 2 is a block diagram illustrating a gun-shaped embodiment of scanning system of FIG. 1.

The gun-shaped scanning system in FIG. 2 illustrates the embodiment of the present invention shown in FIG. 1 in greater detail. Scanning system 500 has a pistol-grip type handle 553, and a movable, manually-actuated trigger switch 554 which allow the user to activate light beam 551 after the user has positioned the scanning system to point at symbol 570. A light-weight plastic housing 555 contains laser light source 546, detector 558, optics and signal processing circuitry 555, including a pattern generator, rotator/translator, and microprocessor, and power source or battery 562.

A light-transmissive window 556 in the front end of housing 555 allows outgoing light beam 551 to exit and the incoming reflected light 552 to enter. Scanning system 500 is designed to be aimed at barcode symbol 570 by a user from a position in which the scanning system 500 is spaced from the symbol, or moving across the symbol. Typically, this type of hand-held scanning system is specified to operate at a range of greater than several inches. Scanning system 500 may also function as a portable computer terminal, and in such embodiments includes a keyboard 548 and a display 549, such as described in the previously noted U.S. Pat. No. 4,409,470.

As further depicted in FIG. 2, a beam splitter 547, or multiple lens system of the type discussed hereafter, may be used to focus the light beam into a scanning spot in an appropriate reference plane at the predetermined location. A light source 546, such as a semiconductor laser diode, is positioned to introduce a light beam into the axis of lens 557, and the beam passes through a partially-silvered mirror 547 and other lenses or beam-shaping structure as needed. The beam is reflected from an oscillating mirror 559 which is coupled to a scanning motor 560 which is energized when trigger 554 is pulled. If the light produced by source 546 is marginally visible, an aiming light may be included in the optical system. The aiming light if needed, produces a visible-light spot which may be fixed, or scanned just like the laser beam; the user employs this visible light to aim the scanning system at the symbol before pulling the trigger.

Figure 3:
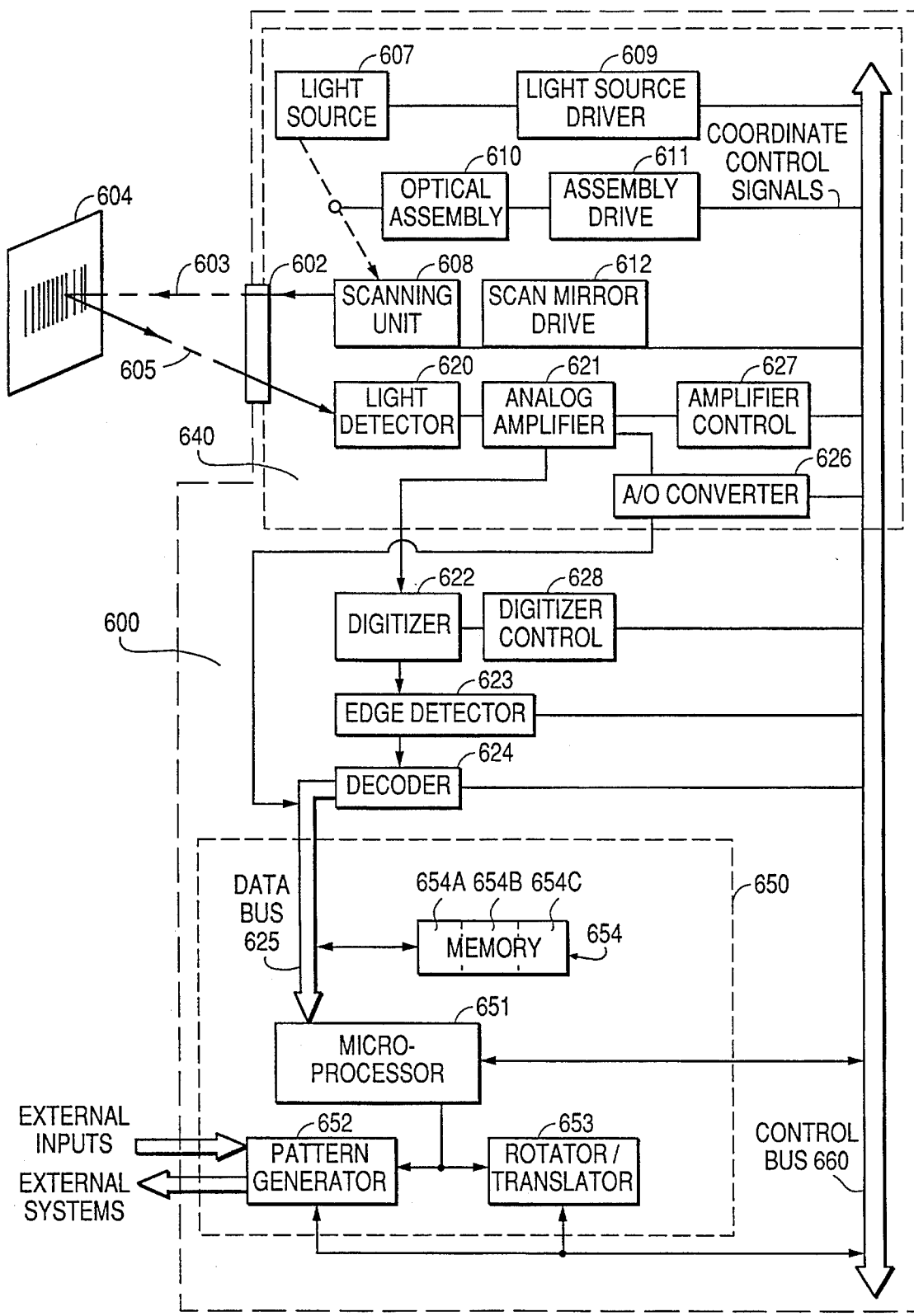
FIG. 3 is a block diagram illustrating another embodiment of the scanning system of FIG. 1.

A simplified block diagram of another embodiment of the present invention is shown in FIG. 3. In FIG. 3, scanner 640, corresponding to element 40 shown in FIG. 1, is illustrated in greater detail, as is the relationship between scanner 640 and control logic unit 650 comprising microprocessor 651, pattern generator 652, and rotator/translator 653. Scanning system 600 may be implemented as a portable (hand-held) scanning system, as a desk-top workstation or as a stationary (fixed) scanning system.

In scanner 640, outgoing light beam 603 is generated by light source 607, usually a laser diode or the like. The light beam from light source 607 is optically modified by an optical assembly 610. The optical assembly 610 may include the auto-focusing lens, and dual X/Y lens elements described hereafter, a scanning motor unit and various control/drive circuitry. Generally speaking, optical assembly 610 is responsive to coordinate control signals transferred from the control logic unit 650 via control bus 660. The outgoing light beam is typically sized and shaped by optical assembly 610 and scanned in a specific pattern. The light beam pattern may be a single line, a raster, or more complex two-dimensional pattern. Scanned beam 603 is then directed by scanning system 600 through an exit window 602 to impinge upon a code bar symbol 604 disposed at a predetermined target location.

Reflected and/or scattered light 605 from symbol 604 is detected by a light detector 620 of scanner element 640. Light detector 620 produces electrical signals to be processed and decoded in order to reproduce the data represented in barcode symbol 604. The output of light detector 620 is applied to an analog amplifier 621 having an adjustable or selectable gain and bandwidth. Amplifier control signals applied from data bus 625 effect adjustment of circuit values in analog amplifier 621. One output of analog amplifier 621 is applied to an analog-to-digital (A/D) converter 626. A/D converter 626 is connected to control bus 660 to transfer the sampled digital signal for processing by control logic unit 650.

Another output of analog amplifier 621 is applied to a digitizer 622. Digitizer 622 converts the analog signal from analog amplifier 621 into a pulse width modulated digital signal. Digitizer 622, described hereafter, utilizes variable threshold levels which, according to the present invention, can be appropriately adjusted. Digitizer control signals from control bus 660 effect the adjustment of threshold levels in digitizer 622.

The output of digitizer 622 is applied to an edge detector 623. The operation of edge detector 623 is explained in U.S. application Ser. No. 506,674 filed Apr. 9, 1990. Edge detector 623 is connected to decoder 624, which may function in the conventional manner described in the BACKGROUND OF THE INVENTION or in the manner described hereafter. The decoded data may be stored in a latch (not shown) which is connected to data bus 625, and control bus 660. Decoded data is thus presented to control logic unit 650 for further processing and also may be subsequently applied to external systems and/or an external memory.

Figure 4:
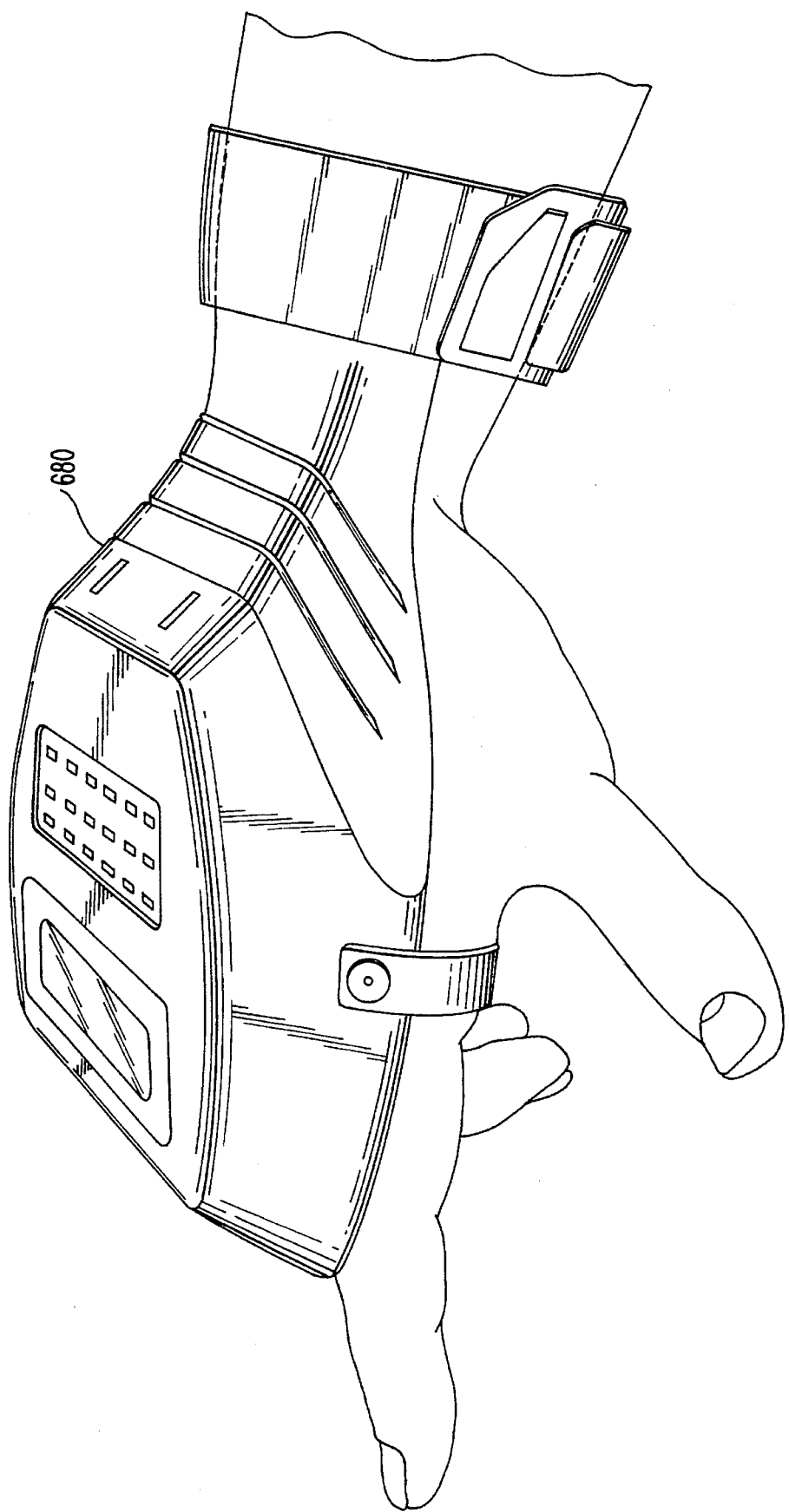
FIG. 4 is a block diagram illustrating a hand-mounted embodiment of the scanning system of FIG. 1.
Figure 5:
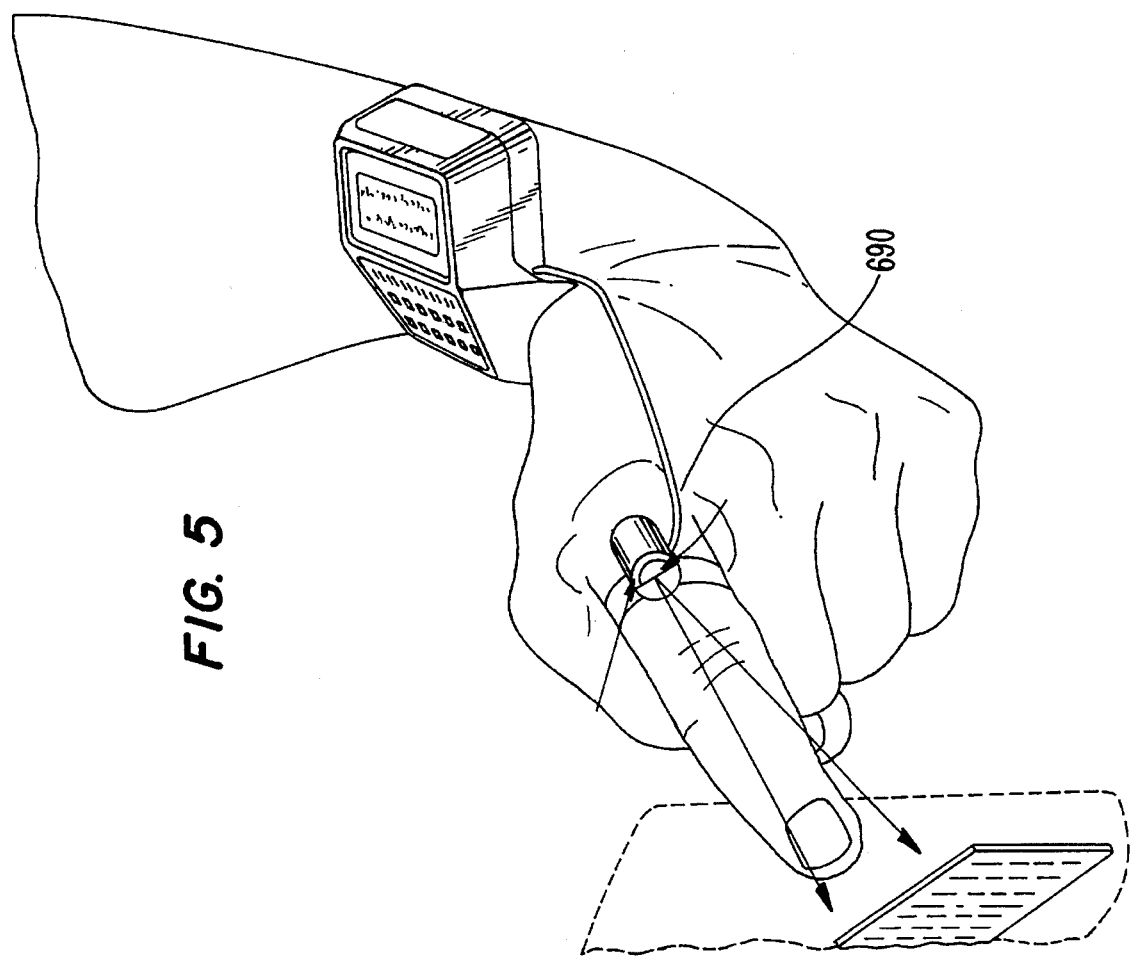
FIG. 5 is a block diagram illustrating a ring-mounted embodiment of the scanning system of FIG. 1.

An embodiment of the present invention may assume the form of a hand-mounted unit 680, such as that shown in FIG. 4, or a ring-scanner 690, such as that shown in FIG. 5. A movable trigger switch, such as the one shown on the housing in FIG. 2, may be employed to allow the user to manually activate the scanner when the user has directed the scanning system at a symbol to be read. Various "triggerless" activation techniques such as voice and object sensing may also be used.

B. THE MICROPROCESSOR

Figure 6:
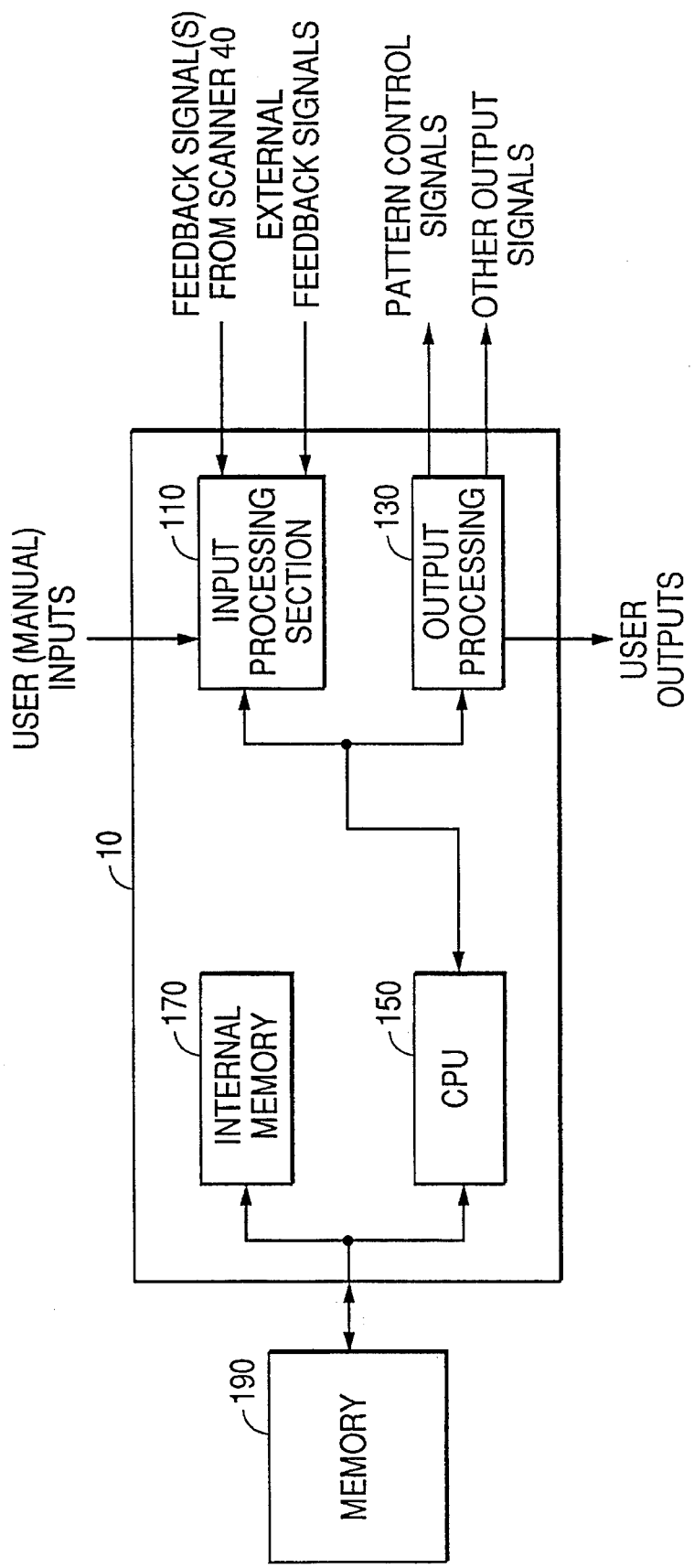
FIG. 6 is in block diagram illustrating the microprocessor shown in the scanning system of FIG. 1.

FIG. 6 generally illustrates an exemplary microprocessor 10 of the type used in an embodiment of the present invention. Input signals received from a user interface (not shown), scanner 40 (FIG. 1) or other external devices are received and processed in an input processing section 110. Input processing section 110 includes buffer circuits and other processing circuits which convert input signal levels and input signal forms into electrical signals compatible with internal microprocessor operations. Output processing section 130 analogously converts internal microprocessor electrical signals into output signals compatible with the user interface, pattern generator 20, rotator translator 30, scanner 40, and other external circuits.

In response to the various input signals, the control logic section 150 of microprocessor 10 calls subroutines from internal memory 170 or external memory 190, and executes the subroutines to adaptively alter the various output signals. Specific microprocessor operations will be described in greater detail in following sections.

C. THE PATTERN GENERATOR

Figure 7:
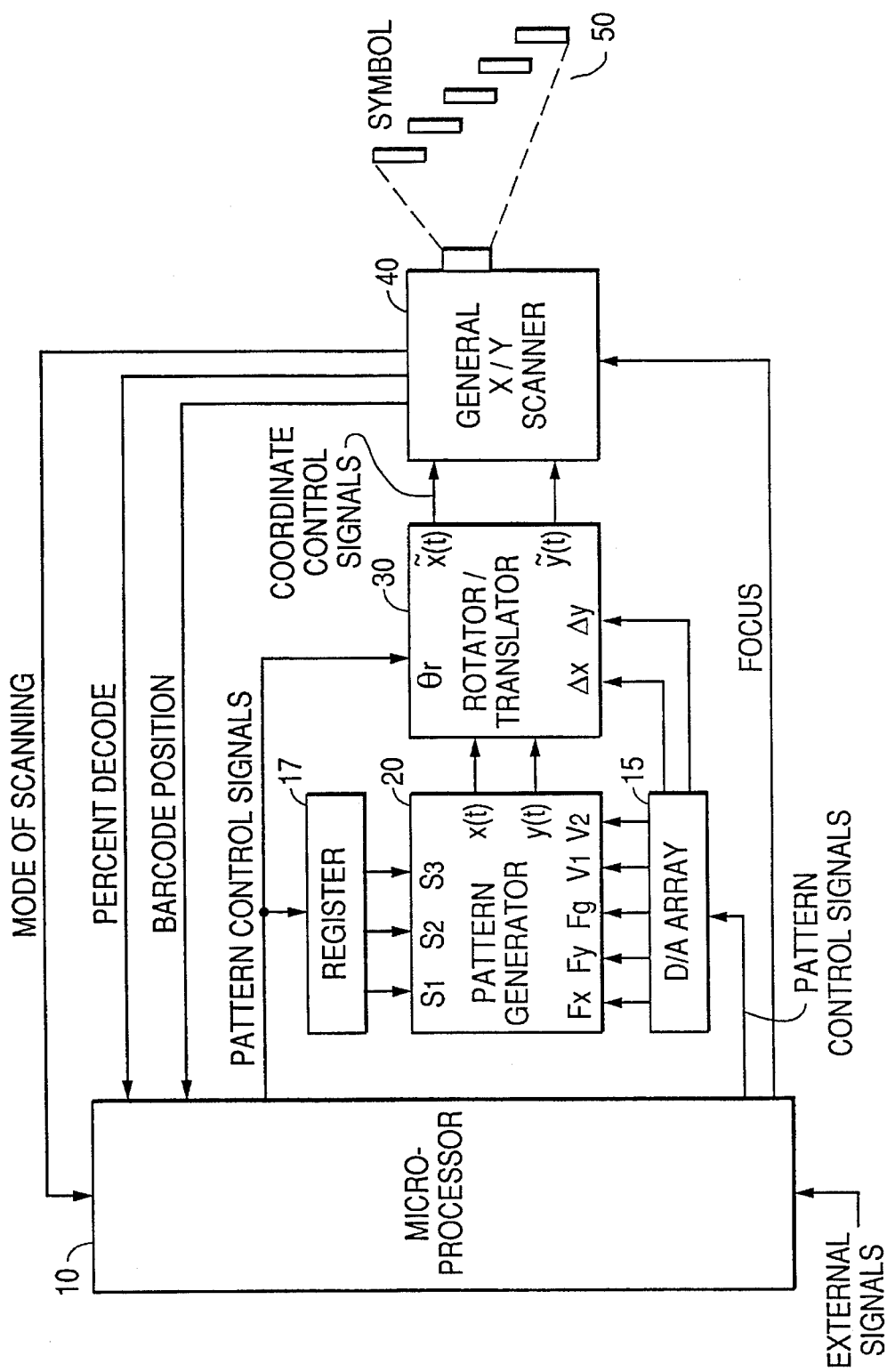
FIG. 7 is a block diagram illustrating the scanning system of FIG. 1 in greater detail.

FIG. 7 illustrates in greater detail the embodiment of the present invention shown in FIG. 1. A pattern generator circuit 20 of the type used in an embodiment of the present invention is shown in detail in FIG. 8.

In FIG. 7, microprocessor 10, in response to various feedback signals, generates pattern control signals including oscillator control signals fx, fg, and fy, switch signals S1, S2 and S3, and DC waveform control voltages V1 and V2. From this set of pattern control signals, pattern generator 20 generates coordinate control signals x(t) and y(t) which are applied to scanner 40 through rotator/translator 30. Several of the pattern control signals generated in microprocessor 10 are typically n-bit, signed digital words which are converted to analog form by output processing section 130 of the microprocessor 10 (see FIG. 6), or by an external D/A convertor array 15 shown, for example, in FIG. 7. Alternatively, conventional monolithic oscillators having digital inputs for frequency selection can be used. Single-bit switch signals may be held in output processing section 130 or in a register 17 internal or external to pattern generator 20.

Figure 8:
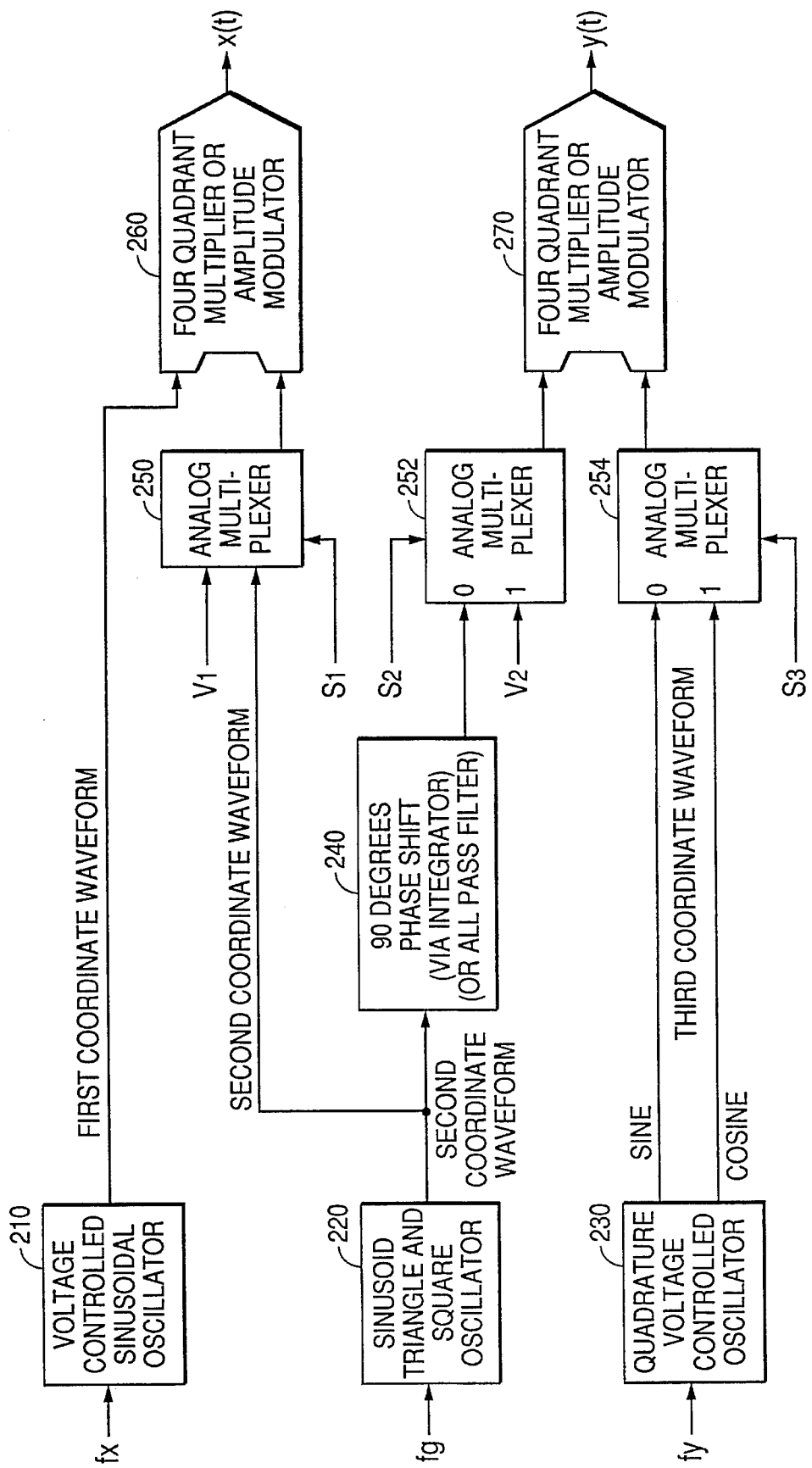
FIG. 8 is a block diagram illustrating an embodiment of the pattern generator shown in the scanning system of FIG. 1.

As shown in FIG. 8, once converted into analog form, oscillator control signals fx, fg, and fy are respectively applied to separate oscillators. First oscillator control signal fx is applied to the input of a conventional voltage controlled sinusoidal oscillator 210 to produce a first coordinate waveform signal which is applied to a first four quadrant multiplier (or amplitude modulator) 260.

Second oscillator control signal fg is applied to the input of sinusoid, triangle and square waveform oscillator 220. Convention forms of this oscillator, for example NE566 manufactured by Signetics is commercially available. The output of oscillator 220 is applied to a second input of a first analog multiplexer 250. First waveform control voltage V1 is applied to a first input of first analog multiplexer 250. The output of first analog multiplexer 250 is selected in accordance with first switch signal S1, and applied to first four quadrant multiplier 260. The first coordinate control signal x(t) is, thus, a product of the first coordinate waveform and the output of first analog multiplexer 250.

The output of oscillator 220 is also applied to a first input of second analog multiplexer 252 through a 90° phase shifting circuit, such as an integrator circuit or an all pass filter. Second waveform control voltage V2 is applied to a second input of second analog multiplexer 252. The output of second analog multiplexer 252 is selected in accordance with second switch signal S2, and applied to second four quadrant multiplier 270.

Third oscillator control signal fy is applied to the input of a conventional quaduature voltage controlled oscillator 230. The output of oscillator 230 is generated in sine and cosine waveforms which are respectively applied to the first and second inputs of third analog multiplexer 254. The output of third analog multiplexer 254 is selected in accordance with third switch signal S3 and applied to second four quadrant multiplier 270. The second coordinate control signal y(t) is, thus, a product of the output of second analog multiplexer 252 and the output of third multiplexer 254.

The foregoing circuitry implements the following set of pattern generating equations:

$$x(t) = \begin{vmatrix} V1 & \text{if } S1 = 0 \\ \sin(2\pi fgt) & \text{if } S1 = 1 \end{vmatrix} \times |\sin(2\pi fxt)| \quad (1)$$

$$y(t) = \begin{vmatrix} \cos(2\pi fgt) & \text{if } S2 = 0 \\ V2 & \text{if } S2 = 1 \end{vmatrix} \times \begin{vmatrix} \sin(2\pi fyt) & \text{if } S3 = 0 \\ \cos(2\pi fyt) & \text{if } S3 = 1 \end{vmatrix} \quad (2)$$

The coordinate control signals x(t) and y(t) are applied to the scanner 40 in a manner discussed hereafter. When applied to scanner 40, the coordinate control signals control the pattern in which the light beam is directed at a barcode symbol proximate a predetermined location. As feedback signals change, the algorithms run in microprocessor 10 generate new values for pattern control signals fx, fg, fy, S1, S2, S3, V1 and V2. Resulting combinations of these pattern control signals generate new coordinate control signals, x(t) and y(t) which are better adapted to environmental conditions at the predetermined location and/or to condition affecting symbol readability.

Variations in the coordinate control signals x(t) and y(t) can produce an infinite variety of one- and two-dimensional light beam patterns. In addition to linear light beam patterns, the present invention can direct the light beam in the standard raster and jittering raster patterns shown in FIGS. 9(a) and 9(b). Other light beam patterns are also easily obtained by the present invention. FIGS. 10–16 illustrate exemplary two-dimensional light beam patterns obtainable by the present invention. Each exemplary light beam pattern is shown in relation to an X/Y reference axis of unity scale. As will be seen hereafter, the present invention may rotate each light beam pattern about the origin of the X/Y reference axis and/or scale the actual size of the light beam pattern at the predetermined location.

Figure 10:
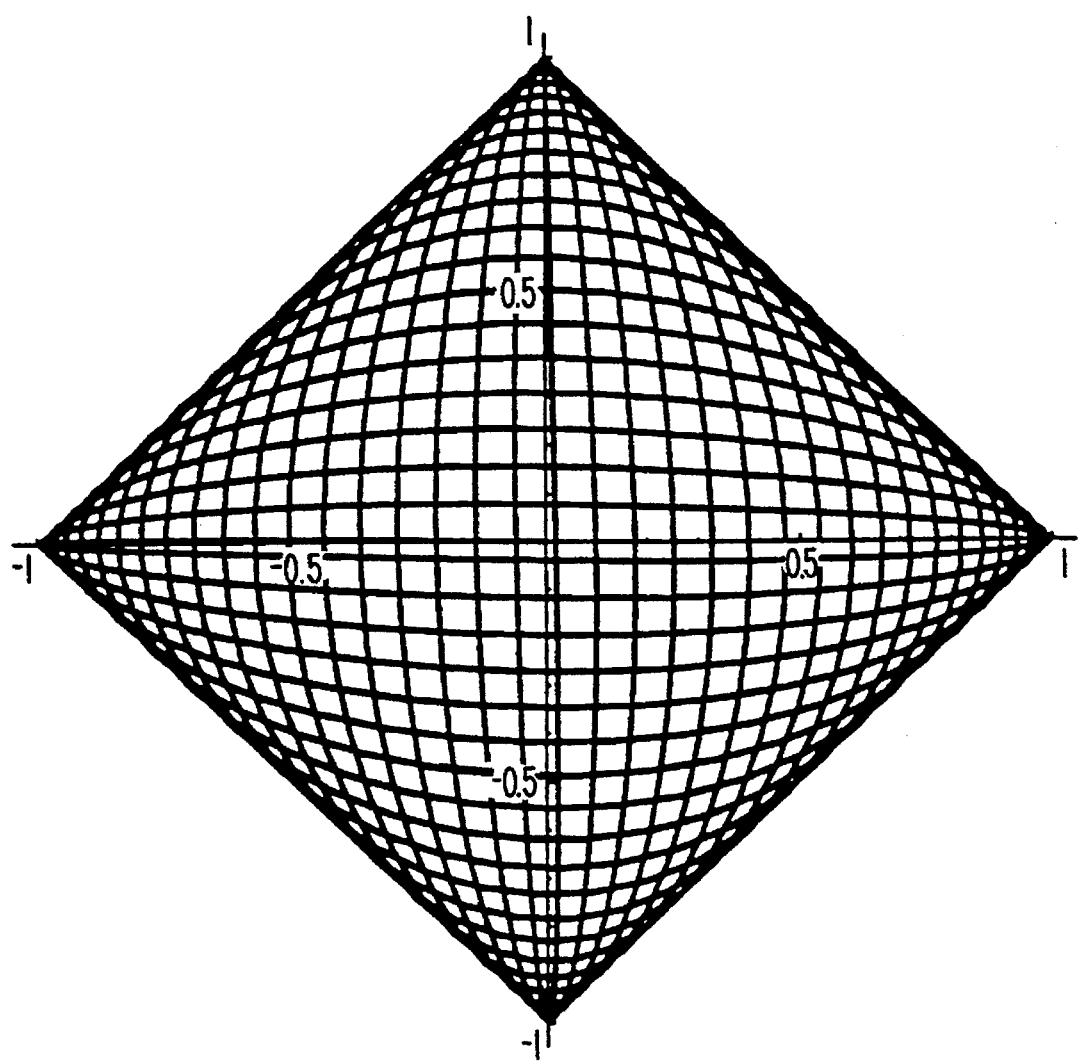
FIGS. 10 is a diagram illustrating a "grid" shaped light beam pattern.
Figure 11:
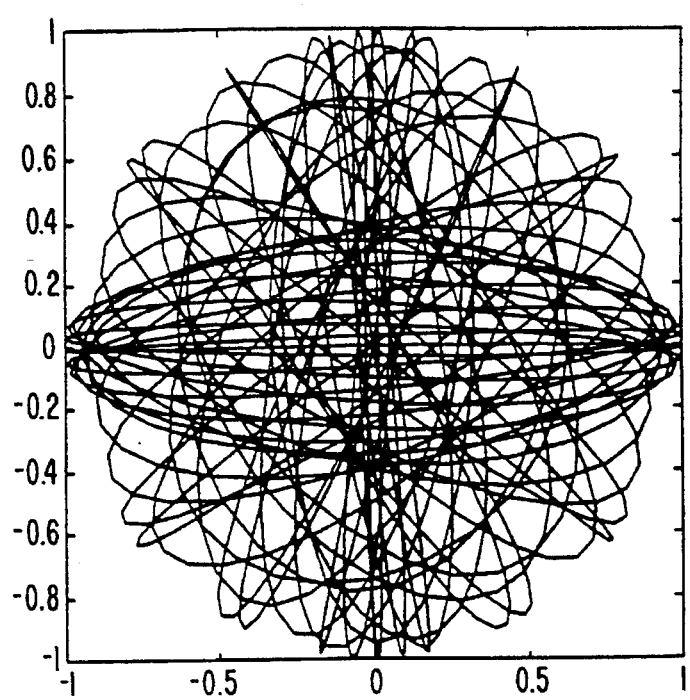
FIGS. 11 is a diagram illustrating a rotating and breathing ellipse light beam pattern.
Figure 12:
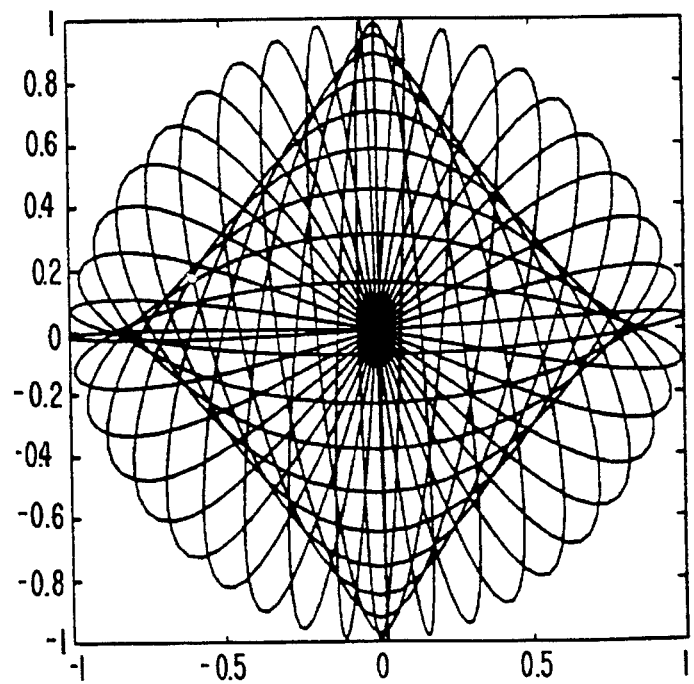
FIGS. 12 is a diagram illustrating a rotating and breathing lissajous light beam pattern.
Figure 13:
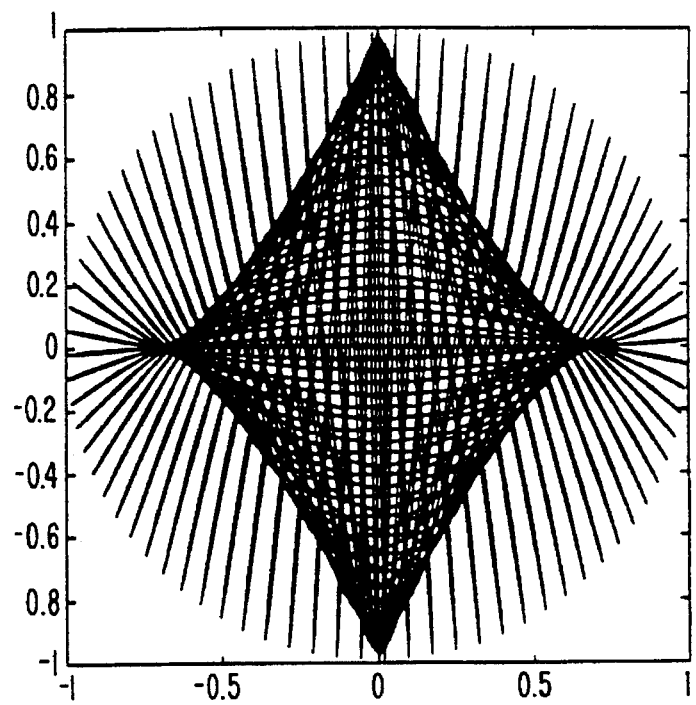
FIGS. 13 is a diagram illustrating a "fishbone" shaped light beam pattern.
Figure 14:
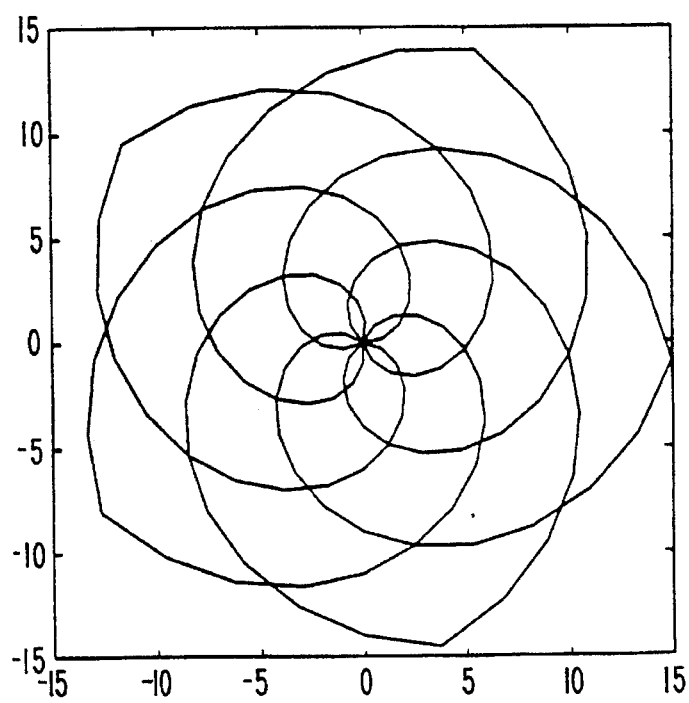
FIGS. 14 is a diagram illustrating a "petal" shaped light beam pattern.
Figure 15:
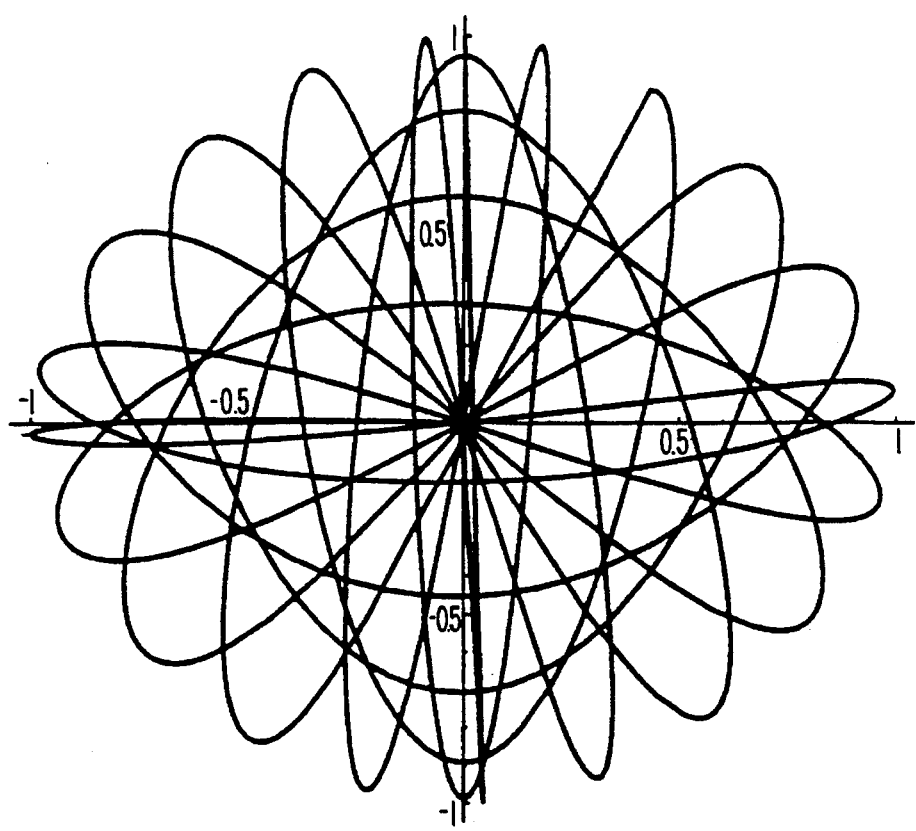
FIGS. 15, is a diagram illustrating a jittering lissajous light beam pattern.
Figure 16:
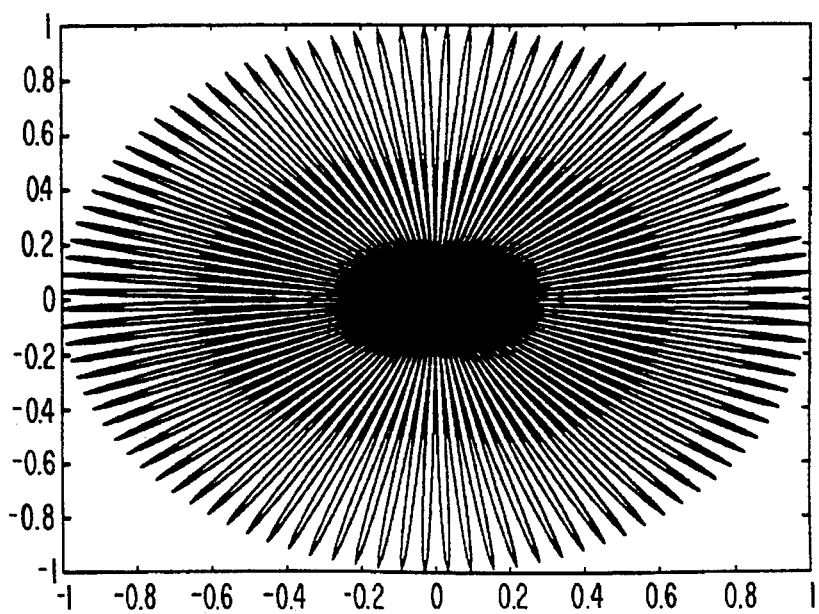
FIGS. 16 is a diagram illustrating a "star" shaped light beam pattern.

FIG. 10 illustrates a "grid" type light beam pattern. FIG. 11 illustrates a rotating and breathing ellipse, and FIG. 12 illustrates a rotating and breathing lissajous. FIG. 13 illustrates a "fishbone" type light beam pattern, and FIG. 14 a "petal" shaped light beam pattern. FIG. 15 illustrates a jittering lissajous, and FIG. 16 illustrates a "star" shaped light beam pattern.

Each light beam pattern has its own unique utility relative to a barcode symbol variously oriented within the X/Y reference axis, and relative to the environmental conditions surrounding the reference axis. For example, the fishbone pattern in FIG. 13 offers improved chances of reading a barcode symbol vertically or horizontally proximate to the origin of the X/Y reference axis. However, the fishbone pattern in FIG. 13 also reduces the chances of reading a barcode symbol in the outlining regions away from the origin. The particular utility offered by any given light beam pattern is determined by its application in a given situation.

D. THE ROTATOR/TRANSLATOR

FIG. 17a illustrates a first example of a rotator/translator circuit 30 of the type used in an embodiment of the present invention. Microprocessor 10 (FIG. 6), in response to various feedback signals, generates pattern control signals which may include a displacement signal. The displacement signal is typically expressed in components: an angular rotation component, and one or more offset components.

Figure 18A:
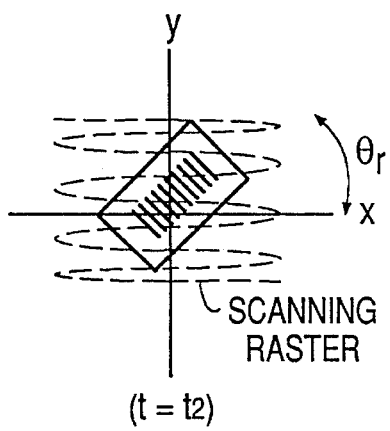
FIGS. 18(a)–18(d) are diagrams explaining the rotation and translation of a light beam pattern.

As previously discussed, scanner 40 directs a light beam pattern at a predetermined location. The disposition of the light beam at the predetermined location can be expressed in relation to a reference X/Y coordinate axis. FIG. 18(a) shows a X/Y reference axis with a standard raster light beam pattern superimposed on it. At its present angular orientation, the standard raster scans only a portion of the barcode symbol. A feedback signal, discussed hereafter, indicates the skewed angular disposition of the symbol to the standard raster light beam pattern. In response to the feedback signal, microprocessor 10 generates a displacement signal having an angular rotation component, $\theta_r$.

Figure 18B:
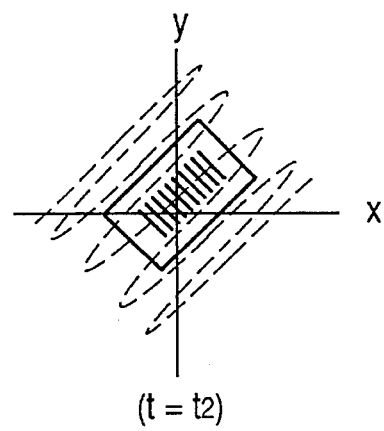

In response to the angular rotation component of the displacement signal, rotator/translator 30 transforms the $x(t_1)$ and $y(t_1)$ coordinate control signals corresponding to the standard raster shown in 18(a) into new $x(t_2)$ and $y(t_2)$ coordinate control signals which correspond to the new standard raster shown in FIG. 18(b). The standard raster shown in 18(b) is rotated about the reference axis by angle $\theta_r$ relative to the standard raster shown in 18(a).

Typically, symbols present at a predetermined location are offset in the X direction and/or the Y direction, as well as, being angularly rotated with reference axis. Such is the case shown in FIG. 18(c), where the barcode symbol is offset from the reference axis origin by $\Delta x$ and $\Delta y$ distances as well as being rotated by an angle $\theta_r$. Feedbacks signals, discussed hereafter, indicate the relative disposition of the symbol within the reference axis. In response to the feedback signals, microprocessor 10 generates a displacement signal having an angular rotation component, an X-offset component, and a Y-offset component.

Figure 18C:
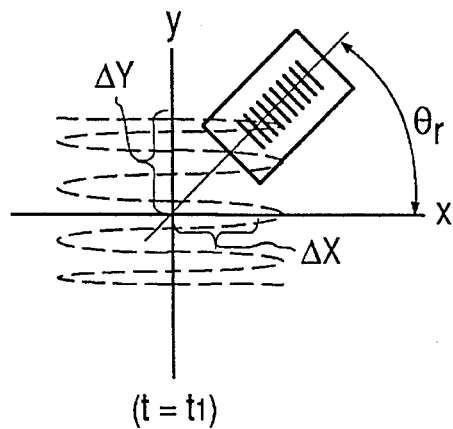
Figure 18D:
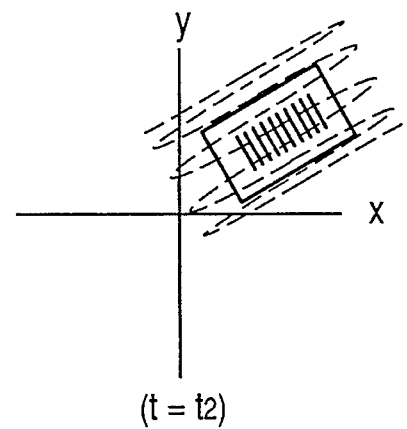

In response to that displacement signal, rotator/translator 30 transforms $x(t_1)$ and $y(t_1)$ coordinate control signals corresponding to the raster shown in FIG. 18(c) into new coordinate control signals, $x(t_2)$ and $y(t_2)$, corresponding to the raster shown in FIG. 18(d). The raster in FIG. 18(d) has been rotated about the reference axis origin by angle $\theta_r$ and translated a distance corresponding to the and offset components.

In FIG. 17a, the angular rotation component $\theta_r$, and offset components $\Delta X$ and $\Delta Y$ are applied to rotator/translator circuit 30. The n-bit, signed digital word that represents angular rotation component $\theta_r$ is applied from the microprocessor 10 to angle latch 300. Sine and cosine functions are addressed in respective ROM look-up tables 301 and 302. Sine and cosine functions might also be directly supplied from microprocessor 10. The n-bit, signed digital words that represent the X offset ($\Delta X$) and Y offset ($\Delta Y$) are applied to latches 310 and 313, converted into analog form by D/A converters 311 and 314, and applied to summers 312 and 315, respectively. The digital sine and cosine functions generated from the ROM look-up tables 302 and 301 are converted to analog form by D/A convertors 303 and 304, respectively, and applied to multipliers 306, 307, 308, and 309.

First multiplier 306 multiplies original coordinate control signal x(t) with function cos(r) to produce x(t)*cos(r). Second multiplier 307 multiplies original coordinate control signal y(t) with the negative value of function sin(r) to produce y(t)*–sin(r). Similarly third and fourth multipliers, 308 and 309 respectively, produce x(t)*sin(r) and Y*cos(r), respectively. The products of first and second multipliers, 306 and 307, respectively, are applied to first summer 312 along with X-offset to produce transformed coordinate control signal X(t). The products of third and fourth multipliers, 308 and 309 respectively, are applied to second four quadrant multiplier 315 along with Y-offset to produce transformed coordinate control signal Y(t).

The foregoing circuit implements rotation and translation about a reference axis in accordance with the equation shown below:

$$\begin{vmatrix} X(t) \\ Y(t) \end{vmatrix} = \begin{vmatrix} \cos(\theta_r) - & \sin(\theta_r) \\ \sin(\theta_r) & \cos(\theta_r) \end{vmatrix} \begin{vmatrix} X(t) \\ Y(t) \end{vmatrix} + \begin{vmatrix} \Delta X \\ \Delta y \end{vmatrix} \quad (3)$$

In the equation, X(t) and Y(t) denote the original coordinate control signals, $\hat{X}(t)$ and $\hat{Y}(t)$ denote the transformed coordinate control signals, $\theta_r$ is the angular rotation component, $\Delta X$ is the X-offset, and $\Delta Y$ is the Y-offset.

Rotator/translator 30 can be implemented in hardware in combination with the circuitry comprising pattern generator 20, or can be implemented as a separate, serially connected circuit. Alternately, rotator/translator 30 and pattern generator 20 functions may be partially or fully implemented in software.

As part of either the rotator/translator 30 or the pattern generator 20, an embodiment of the present invention may include a circuit or software routine to scale the size of the light beam pattern at the predetermined location. The scaling operation can be expressed by the following equation:

$$\begin{vmatrix} X(t) \\ Y(t) \end{vmatrix} = \begin{vmatrix} S_x & 0 \\ 0 & S_y \end{vmatrix} \begin{vmatrix} X(t) \\ Y(t) \end{vmatrix} \quad (4)$$

where $S_x$ and $S_y$ are selected scaling factors for coordinate control signals X(t) and Y(t), respectively. This equation can be implemented in a circuit similar to that shown in FIG. 17a where "multiplier" 320 receives the output of summer 312 and scaling factor signal $S_x$, and "multiplier" 321 receives the output of summer 315 and scaling factor signal $S_y$. The term "multiplier" is used to describe the scaling product derived from circuit elements 320 and 321. As shown in FIG. 17b, "multipliers" 320 and 321 may be implemented by differential amplifier 330 and DAC 331.

Figure 17C:
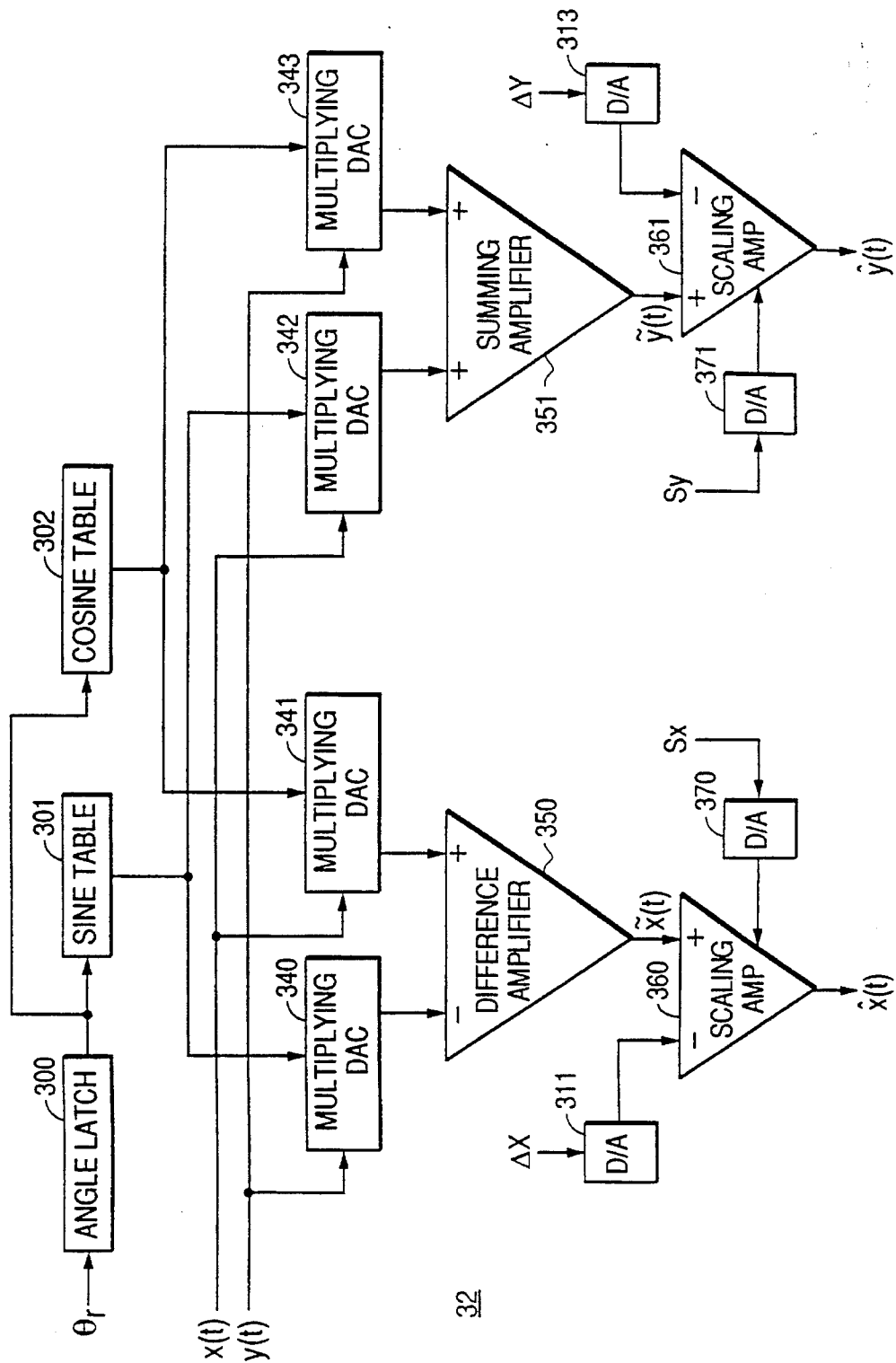
FIG. 17c is a block diagram illustrating another embodiment of the rotator/translator shown in FIG. 1.

FIG. 17c illustrates a second example of a rotator/translator circuit 31 of the type used in an embodiment of the present invention. Similar elements to the device shown in FIG. 17a are similarly designated. The angular rotation component, $\theta_r$, and offset components, $\Delta X$ and $\Delta Y$, are applied to rotator/translator circuit 31. X offset, $\Delta X$, is applied through D/A converter 311 to first scaling amplifier 360, and Y offset, $\Delta Y$, is applied through D/A converter 314 to second scaling amplifier 361. Angular rotation component $\theta r$ is applied to angle latch 300 and converted into a signed 8-bit word by look-up tables 301 and 302.

The resulting sine(r) and cosine (r) functions from look-up tables 301 and 302 are applied with coordinate control signals x(t) and y(t) to first, second, third and fourth multiplying DACs 340, 341, 342, and 343 as shown in FIG. 17c. First multiplying DAC 340 produces first product y(t)*sin(r) which is applied to a first input of differential amplifier 350. Second multiplying DAC 341 produces second product x(t)*cos(r) and applies it to the second input of differential amplifier 350. Similarly, third and fourth multiplying DACs 342 and 343 produce third product x(t)*sin(r) and fourth product y(t)*cos(r) respectively, and apply these products to the first and second inputs of differential amplifier 351.

Differential amplifier 350 produces rotated coordinate control signal $\tilde{x}(t)=x(t)*\cos(r)-y(t)*\sin(r)$. This signal is subsequently scaled in accordance with scaling factor Sx, and transtated in accordance with X offset, $\Delta X$, in first scaling amplifier 360. The product of first scaling amplifier 360 is transformed coordinate control signal $\hat{X}(t)$.

Summing amplifier 351 produces rotated coordinate control signal $\tilde{y}(t)=x(t)*\sin(r)+y(t)*\cos(r)$. This signal is subsequently scaled in accordance with scaling factor Sy, and transtated in accordance with Y offset, $\Delta Y$, in second scaling amplifier 367. The product of second scaling amplifier 361 is transformed coordinate control signal $\hat{Y}(t)$.

The benefits of the exemplary rotator/translator circuits in FIGS. 17a and 17c as compared with comparable mechanical rotator/translators are readily apparent. For example, the speed of the exemplary rotator/translator circuits is improved, and the lack of moving parts increases reliability. Scaling can also be achieved in the generation circuitry of the drive signals in scanner 40, or in software.

E. THE SCANNER

The term "scanner" heretofore used in reference to general X/Y scanner element 40 of FIG. 1 includes scanning heads and related control circuitry previously described in the commonly assigned patents referenced in the BACKGROUND OF THE INVENTION and in the foregoing description.

Figure 19B:
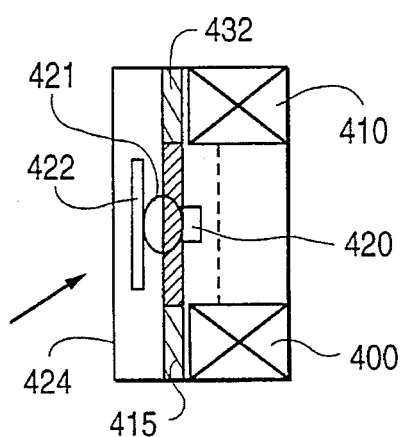
Figure 19A:
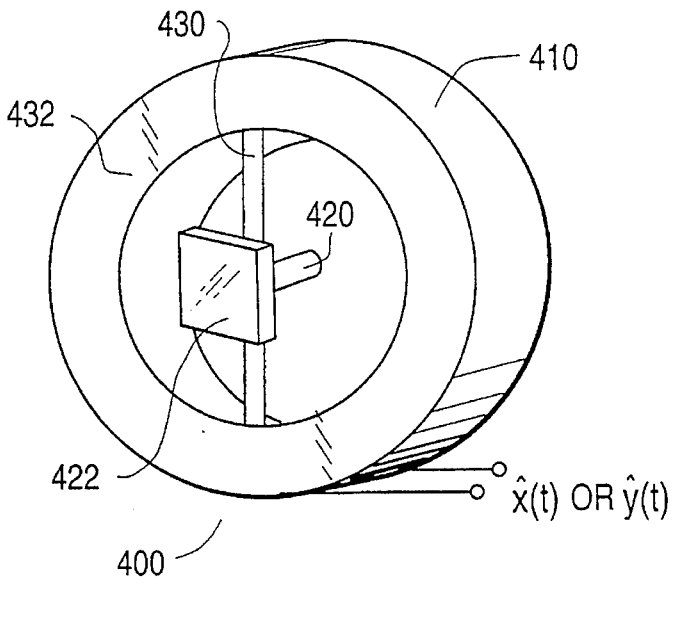
FIG. 19a is a schematic block diagram illustrating an embodiment of an X/Y scanning head within the scanner of FIG. 1.

FIGS. 19a and 19b illustrate an exemplary scanning element for use within scanner 40. The torsional miniature scan element 400 shown in FIGS. 19a and 19b provides a range of operating frequencies between approximately 1 Hz to 180 Hz without physical or mechanical adjustments or tuning. In FIG. 19a mirror 422 and permanent magnet 420 are opposingly attached to and mechanically balanced on a flexible strip 430. This flexible stir is attached to opposite sides of a coil 410 by means of a flexible strip holder 432.

FIG. 19b is a cut-away side view of FIG. 19a. In FIG. 19b, the magnet/mirror holder 421 which attaches mirror 422 and permanent magnet 420 to flexible stirp 430 can be seen. A shock-absorber 415 may be interposed between the flexible strip holder 432 and coil 410. Finally, a transparent mirror protector 424 may be attached to the scan element 400.

When an alternating current coordinate control signal is applied to coil 410, interaction of the magnetic fields of the coil 410 and permanent magnet 420 cause the flexible strip 430 to torsionally oscillate. X-Y scanning may be accomplished by the dual scan element arrangement shown, for example, in FIG. 19c.

Figure 19C:
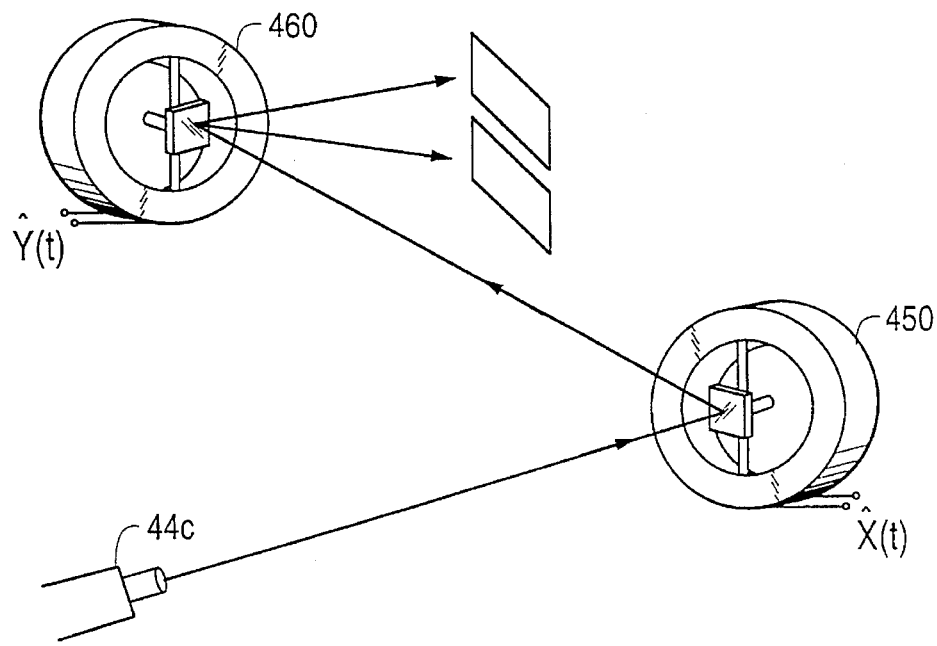
FIG. 19c is a schematic block diagram illustrating an embodiment of an X and a Y scanning head within the scanner of FIG. 1.

In FIG. 19c, a light beam from laser source 440 is directed to X-scan element 450 which deflects the light beam to Y-scan element 460. The light beam directed from Y-scan element 460 is scanned in a predetermined pattern determined by coordinate control signals X(t) and Y(t).

Figure 20A:
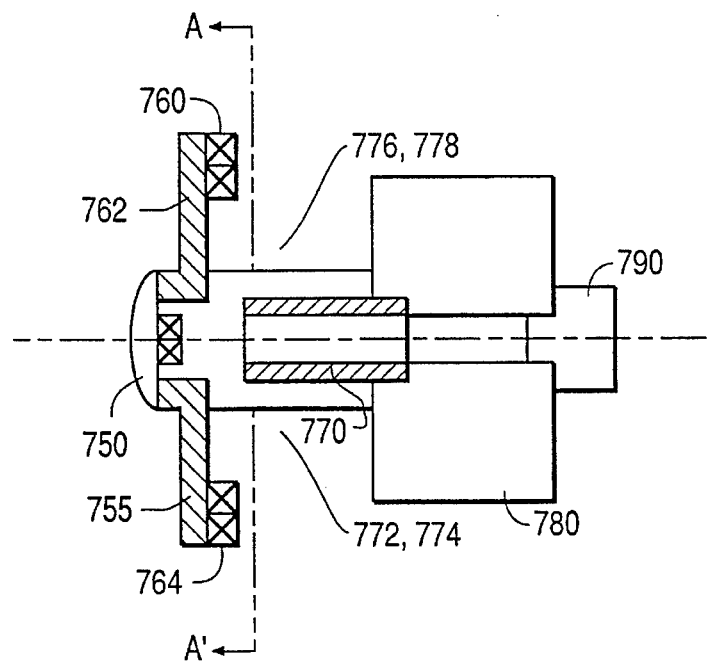
FIGS. 20(a) and (b) are schematic diagrams illustrating an autofocusing lens arrangement within the scanner shown in FIG. 1.
Figure 20B:
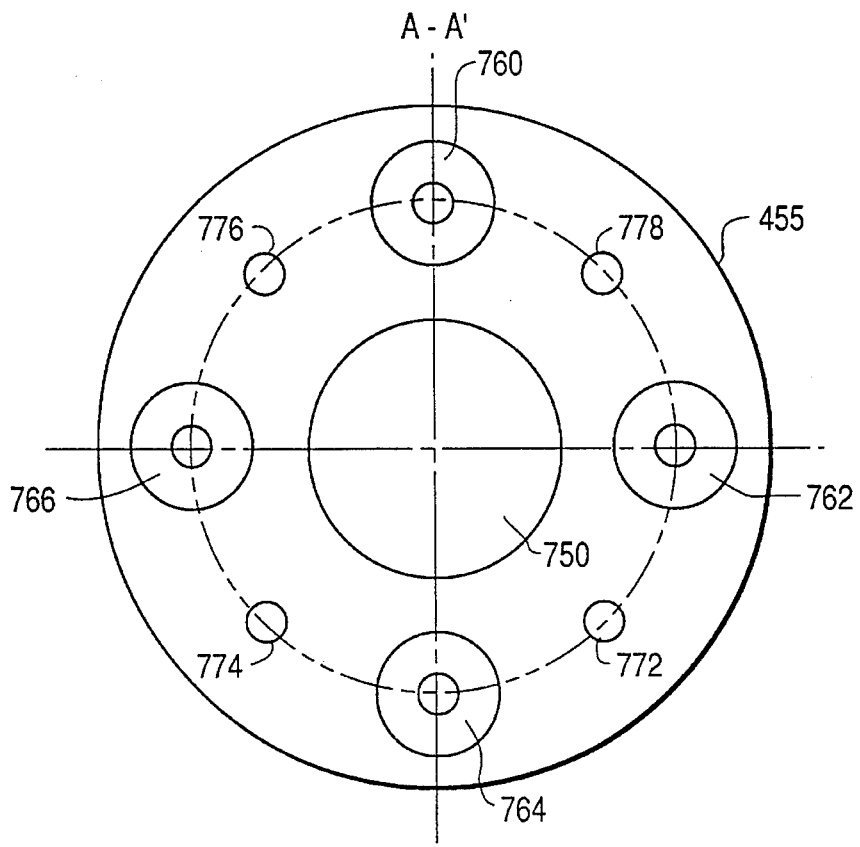

FIGS. 20(a) and 20(b) illustrate an exemplary autofocusing, four-wire scanning head arrangement of the type usable with scanner 40 of the present invention. In FIG. 20(a), a single objective lens 750 is mounted on one side of PC board 755 and four coils 760, 762, 764, and 768 are mounted on the other side of PC board 755. PC board 455 is supported by first ends of alloy wires 772, 774, 776 and 778. Second ends of alloy wires 772, 774, 776 and 778 are attached to laser holder 780. Laser diode 790 and permanent ring magnet 770 are also mounted on laser holder 780. Alloy wires 772–778 carry drive current to respective coils 760–766.

In FIG. 20(a), ring magnet 770 is magnetized parallel to its thickness, for example, negatively magnetized towards the laser diode 790 and positively magnetized towards the lens 750. The center hole in ring magnet 770 acts as an aperture stop for the laser beam. Alternatively, a 4-pole ring magnet 770 can be used. With a 4-pole ring magnet, objective lens 750 can be rotated as well as laterally moved with respect to laser diode 740 to effect auto-focusing during scanning.

F. MODES OF OPERATION

The present invention provides for operation in one of three basic modes; learning mode, adapted mode, and real-time adaptive mode.

Learning mode allows the scanning system to "learn" a best light beam pattern for various applications. Thus, in fixed-mode applications where articles with symbols are presented to the scanning system under fairly repeatable conditions, the scanning system can try combinations of output power, focus adjustment, and light beam pattern (location, shape, size, and/or orientation) and then collect readability data for each combination. Once sufficient statistical data (percent decode, decode speed, decode thresholding) is accumulated, the scanning system can select and store in memory an optimal combination of operating parameters. Optimal combinations of operating parameters may be stored for one-dimensional and two-dimensional barcode symbols. A user may then select the "learned" set of parameters from memory for a particular application, or the scanning system may automatically select a "learned" set of parameters. The software and/or hardware to accomplish the learning mode may reside in a neural network controlled by fuzzy logic.

A scanning system may also learn optimal combinations of operating parameters for hand-held applications. For example, small raster patterns have shown improved results over single-line scans in reading truncated one-dimensional barcode symbols. A truncated barcode symbol is one which because of its small X/Y aspect ratio, is not completely scanned by the light-beam pattern. The present invention provides the ability to learn an optimal small raster scan for reading one-dimensional barcode symbols.

Small raster scans are defined by $x(t)=X_{max}\sin(2\pi fxt)$, and $y(t)=Y_{max}\sin(2\pi fyt)$. Assuming $fx=60$ $H_z$ and that the maximum amplitude of x, $X_{max}$, is fixed, the ratios $fx/fy$ and $Y_{max}/X_{max}$ are referred to as the frequency and height ratios. The frequency and height ratios may be selected to optimize barcode symbol readability depending on the type and size of symbol read.

Once a set of optimal operating parameters has been obtained and entered into the control logic of the scanning system, the system will operate in a set, or adapted mode until instructed to operate otherwise. Thus, a scanning system operating in adapted mode will direct the light beam according to the "learned" set of operating parameters. An adapted mode of operation can be overridden by manual or other external signals, as well as, by internal override signals which arise if the adapted mode fails to decode symbols due to some change in the environment.

In applications, such as the following conveyor belt and fixed presentation examples where the nature and disposition of symbols is highly variable, the scanning system may be operated in a real-time adaptive mode. In the real-time adaptive mode, the scanning system continually seeks to adjust scanning system operating parameters, and in particular the light beam pattern, to maximize symbol readability. Once again, control of the real-time adaptive mode may be accomplished using fuzzy logic.

G. FEEDBACK SIGNALS

Many different feedback signals may be used by microprocessor 10 (FIG. 1) to adapt the light beam pattern directed at the predetermined location. These feedback signals may be divided into two categories: internal feedback signals derived from a detected portion of the reflected light beam or from a source within the scanning system, and feedback signals derived from other external sources. Examples of both categories are discussed below.

(1) Mode of Scanning

Sensors within the scanning system or manual inputs indicate to microprocessor 10 whether the scanning system is being used in a hand-held or fixed mode. In response to an indication that the scanning system is being operated in a hand-held mode, microprocessor 10 will generate pattern control signals to produce a linear (or near linear, such as a small raster) light beam pattern which can be easily aimed by a user.

Alternatively, microprocessor 10 might generate a predetermined two-dimensional light beam pattern, or a series of patterns, in response to a feedback signal indication of fixed mode operation. As previously discussed, the present invention provides means for operating in a "learning mode," wherein the scanning system generates a series of light beam patterns and "learns" which pattern most efficiently reads symbols in a particular application. Since a large number of fixed mode scanning applications are repeatable in the sense that symbols are presented to the scanning system under similar environmental conditions, the scanning system may learn an "optimal" light beam pattern and recall that pattern in a particular fixed mode application. Optimal light beam patterns for multiple fixed mode applications can be learned and stored in memory. Each "learned" optimal light beam pattern can then be recalled on the basis of a manual selection, or a scanning system determination based on some other feedback signal.

(2) Percent Decode

Upon obtaining a scan, the scanning system of the present invention seeks to decode the digital data derived from the scan in the manner previously discussed. When operating in the "learning mode" or in the "real-time adaptive mode," the scanning system successively scans the predetermined location and attempts to decode the detected portion of the reflected light beam. By successively scanning and attempting to decode a symbol at the predetermined location, the scanning system develops percent decode data.

For example, a scanning system operating in a real-time adaptive mode might successively scan and attempt to decode a symbol ten times. Multiple decoding attempts occur fast enough to be user transparent. If, assuming a threshold of 70%, the scanning system successfully decodes 8 or more scans out of 10, then a positive decode indication is given to the user and the decoded data is accepted by the scanning system. However, if 3 or more attempts to decode successive scans are unsuccessful, then the scanning system adjusts the light beam pattern and again attempts to obtain 8 or more out of 10 successfully decoded scans.

A scanning system operating in a "learning mode", might successively scan and attempt to decode a symbol ten times. Again assuming a threshold of 70%, the scanning system will save a particular set of operating parameters once 8 or more scans have been successfully decoded.

(3) Edge Detection

U.S. application Ser. No. 862,471, filed Apr. 2, 1992 (hereafter the "Multi-bit Digitizer" application) which is commonly assigned to the assignee of the present invention and hereby incorporated by reference, describes a multi-bit digitizer for a barcode symbol scanning system. Whereas conventional digitizers only detect the presence of barcode symbol edges, the multi-bit digitizer detects the presence of an edge, and measures the strength of the detected edge. This additional information is passed to a decoder to facilitate multi-bit threshold processing by resident software routines. The edge strength signal is also presented to the microprocessor 10 as a feedback signal and used to determine an optimal, or at least an improved light beam pattern and/or laser spot focusing adjustment for reading a symbol.

Figure 21:
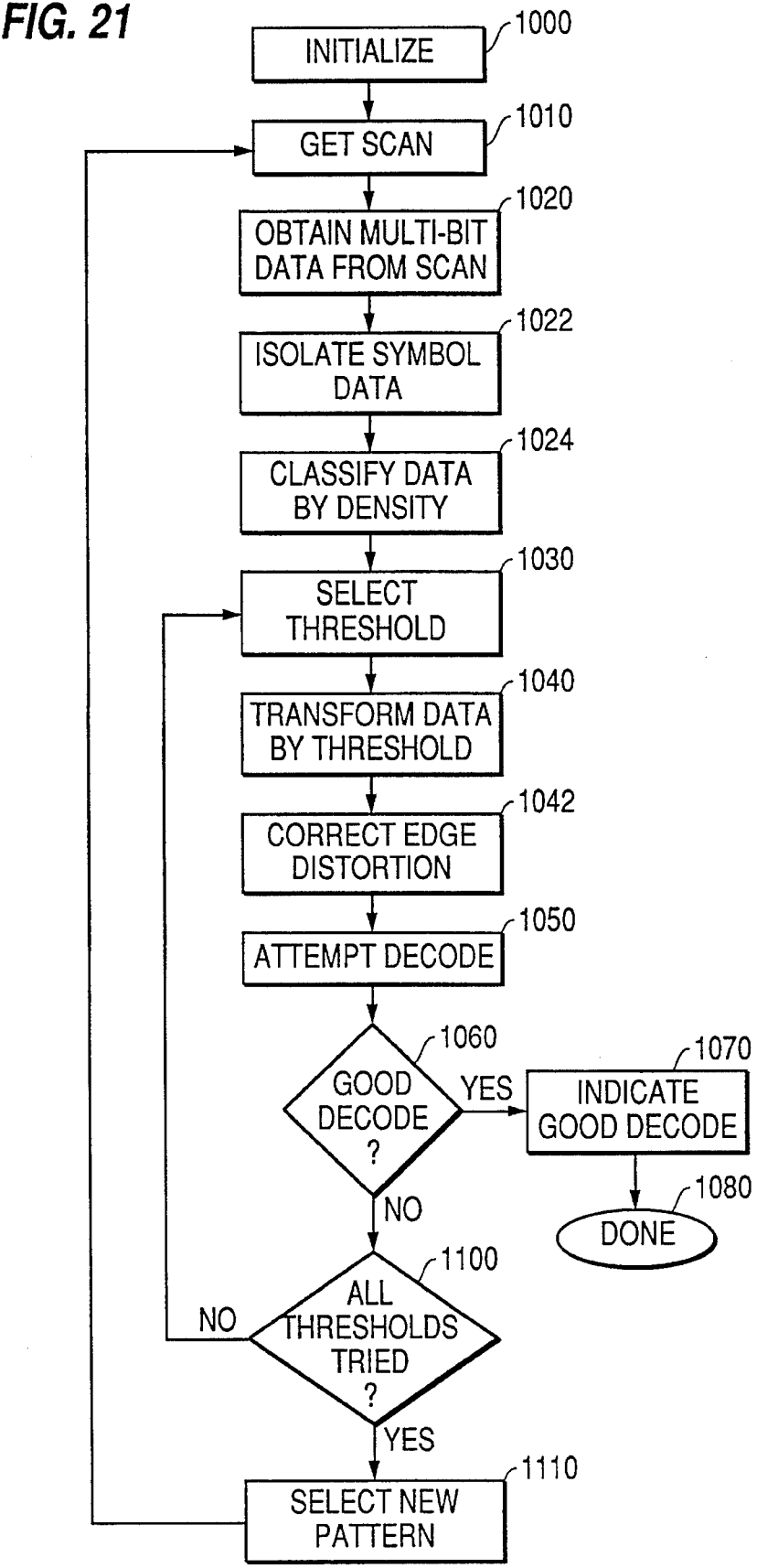
FIG. 21 is a flowchart illustrating the operation of a multi-bit digitizer in the scanning system of FIG. 1.
Figure 22:
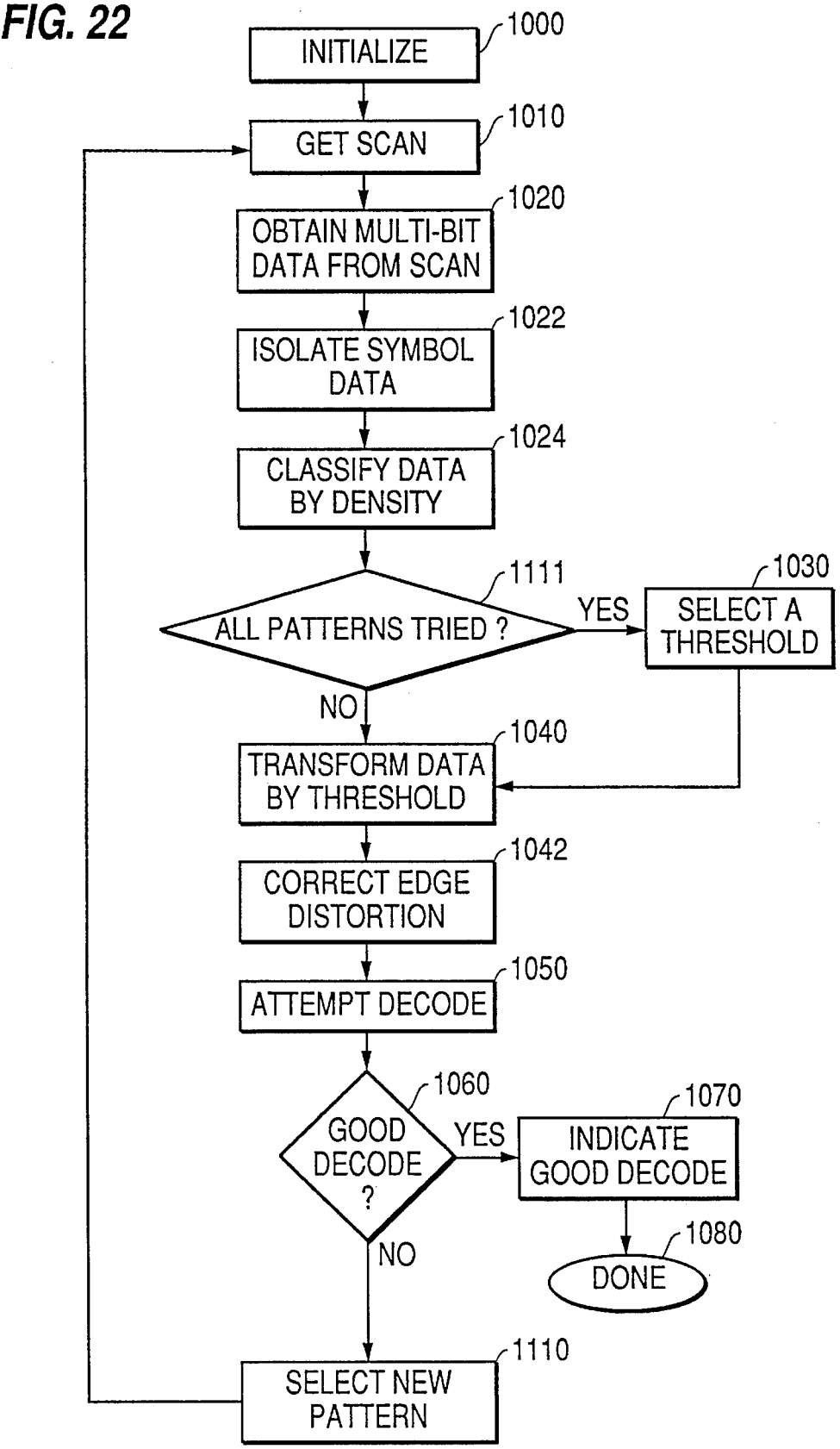
FIG. 22 is a flowchart illustrating another operation of a multi-bit digitizer in the scanning system of FIG. 1.

Operation of the multi-bit digitizer as a feedback signal source within an embodiment of the present invention is illustrated in diagrams shown in FIGS. 21 and 22. After initialization (1000), a scanning system obtains a scan (1010). Once a scan is obtained, an analog signal representative of the scan is produced and the positive and negative edges of the scan are detected. The strength of the detected edges and timing signals indicative of the relation are generated as multi-bit digital data (1020). Symbol data is isolated from the symbol margins and from other unwanted graphical text data (1022). Symbol density is classified based on the rise time and edge durations of a predetermined timing signal and the edge strength signed (1024). The timing signal and digital signals are applied to a decoder which performs multiple threshold processing on individual scans by processing each scan a multiple number of times at different detection threshold levels. Thus, for each scan a first predetermined threshold is selected (1030), and the multi-bit data is transformed using the threshold (1040). Before decoding is attempted (1050), edge distortion is corrected using the timing and edge strength signals of adjacent for wide and narrow elements. If decoding is successful (1060-yes), a positive indication is output to a user interface (1070) and the process is done (1080).

If, however, the first selected threshold is unsuccessful in decoding the scan (1060-no) a next predetermined threshold is selected (1100-no) and the process returns to step (1030). At some point where a number of predetermined thresholds have failed to successfully decode the scan, a determination is made that all thresholds have been tested. If so, (1100-yes) the scanning system will select a new light beam pattern (1110) and return to step (1010) to obtain a scan. The new light beam pattern selected in step (1110) may be selected on the basis of a preset series of light beam patterns, or on the basis of another feedback signal, for example, percent decode, barcode symbol position, etc.

FIG. 22 illustrates an alternative method wherein similarly labeled steps perform functions similar to those in FIG. 21. However, once a first threshold has been selected during initialization (1000) the method tests whether all light beam patterns have been tried for that threshold (1111). If all light beam patterns have not been tried the method continues to select new patterns (1110) so long as decoding is unsuccessful (1060-no). Once all of the predetermined light beam patterns have been tried, a second and subsequent thresholds are selected (1030).

(4) Barcode Symbol Position

U.S. patent application Ser. No. 07/851,493, filed Mar. 16, 1992, commonly assigned to the assignee of the present invention and hereby incorporated by reference, describes a method and apparatus for scanning and decoding a two-dimensional barcode symbol, such as PDF417, using a charge-coupled device (CCD) or a charge modulation device (CMD) camera. In the method and apparatus of this application, a CCD/CMD camera is used to obtain an image of a two-dimensional symbol. The image is converted to a digital data and then stored in memory. Once stored in memory, the image data can be repeatedly accessed to extract various spatial information regarding the symbol. In particular, the location and orientation of the symbol relative to a reference axis can be determined from the stored image data.

Figure 23:
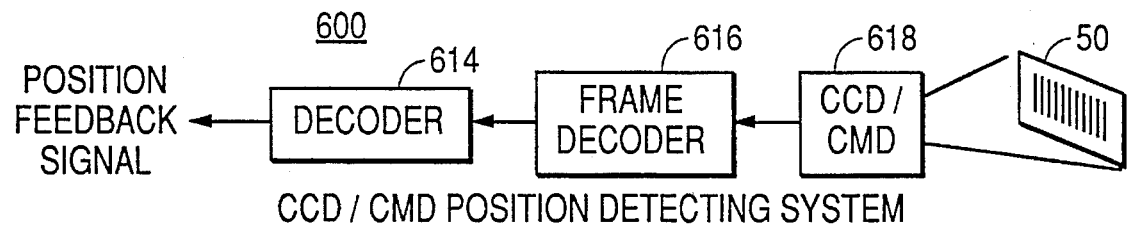
FIG. 23 is a block diagram illustrating an embodiment of a system for use with the scanning systems shown in FIGS. 1 and 2 which detects barcode symbol location and orientation using a CCD/CMD camera.

FIG. 23 illustrates a system for detecting the position of a two-dimensional barcode symbol such as PDF417 using a CCD/CMD camera. As shown in FIG. 23, a position detecting system 600 includes a decoder 614, a frame grabber circuit 616, and a two-dimensional CCD or CMD camera 618. CCD/CMD camera 618 takes a picture of a two-dimensional barcode symbol 50 and converts it to electrical signals. Typically, the output of the CCD/CMD camera is an analog signal representing the rows of the image being captured along with horizontal and vertical synchronization information.

Alternatively, if the two-dimensional symbol is moved past the camera, the CCD/CMD camera need only be a one-dimensional device. For example, the barcode symbol may be on an object moving past the camera on a conveyor belt, or may be printed on a document that is being moved in front of the camera. In such cases, the CCD/CMD camera can capture the image of the two-dimensional symbol by taking pictures of successive lines of the symbol as it moves past the camera.

Electrical signals from camera 618 are transmitted to frame grabber circuit 616 which converts the signals into a digital representation of the original image. The analog signals from the CCD/CMD camera are converted to eight-bit gray-level values and transmitted to decoder 614 where they are decoded into a matrix of codeword values corresponding to the rows and columns of the two-dimensional barcode symbol. As explained in further detail below, decoder 614 may be a separate logic unit or may be embodied in a subroutine operating on microprocessor 10. Assuming decoder 614 to be a separate element, position signals from decoder 614 are furnished as feedback signals to microprocessor 10 and used to derive pattern control signals.

Figure 24:
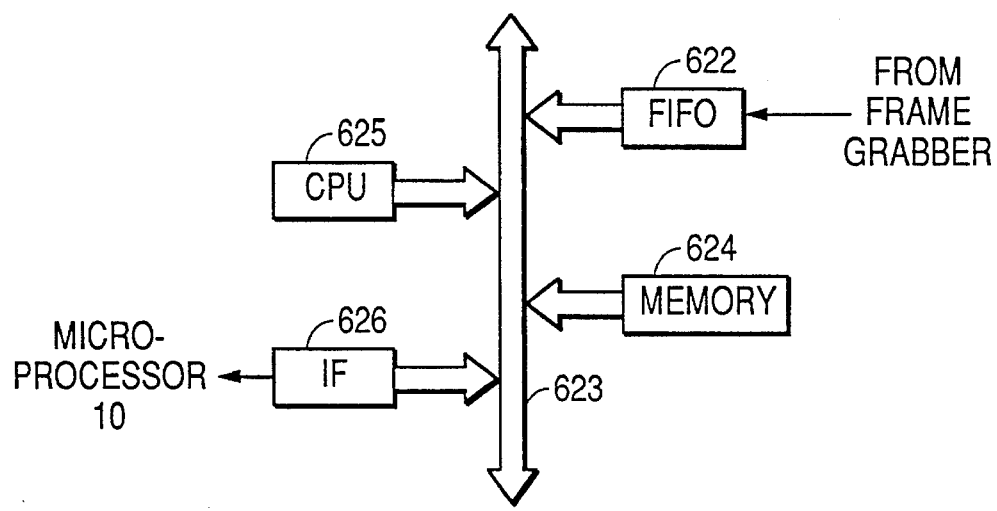
FIG. 24 is a schematic block diagram of an embodiment of the decoder shown in FIG. 23.

FIG. 24 is a schematic block diagram of the hardware apparatus of decoder 614. As shown in FIG. 24, decoder 614 includes a FIFO (first in-first out) memory buffer 622 for receiving digital data representing the image of the two-dimensional barcode symbol from the frame grabber circuit 616. The FIFO buffer 622 temporarily holds the data as it is received from the frame grabber circuit 616 and then stores it in a memory 624. In order to do this, FIFO buffer 622 is connected to a central bus 623 to which the other hardware elements of the decoder are also connected. FIFO buffer 622 has direct memory access (DMA) capability which allows it to store the digital data directly in the memory for decoding. Alternatively, the frame grabber circuit 616 could be connected directly to the bus 623 with DMA capability and thereby store the digital data directly in the memory 624.

The decoder also includes a central processing unit (CPU) 625 and an interface (IF) 626 for communicating with the microprocessor 10. The CPU 625 is preferably a high-speed special purpose microprocessor such as the TMS 320 digital signal processor. The interface to the microprocessor 10 may be a standard interface such as an RS-232 interface.

Figure 25:
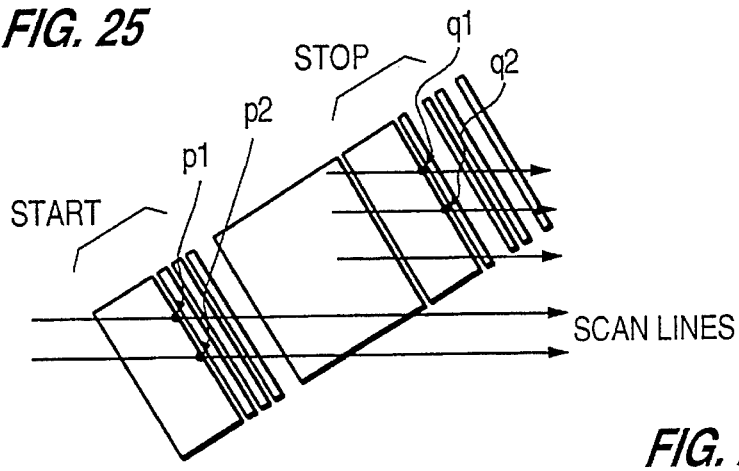
FIGS. 25–28 are diagrams illustrating the method by which the system of FIG. 23 determines the location and orientation of a barcode system.

Decoder circuit 614 is used to decode a two-dimensional barcode symbol such as PDF417, and to find the location and orientation of the symbol in the image data. Finding the location and orientation of the symbol is based on finding the start and stop patterns of the symbol in the image data. Operating on image data stored in memory, the decoder scans the data along a given row of the image as shown in FIG. 25. The data along the row is passed through an edge detector which determines the location of the edges in the data. The decoder then searches through the edge detection data looking for a sequence of eight elements that represent either a start or stop pattern.

The decoder starts at a first row of the image data, and subsequently scans the image data down a predetermined number of rows looking for start or stop patterns. The number of rows between successive scan lines may vary according to the particular environment or the resolution of the image data. For example, where the image data consists of 480 rows by 640 columns of pixel data, the decoder may be set to scan every twentieth row, skipping nineteen rows between successive scan lines.

Figure 26:
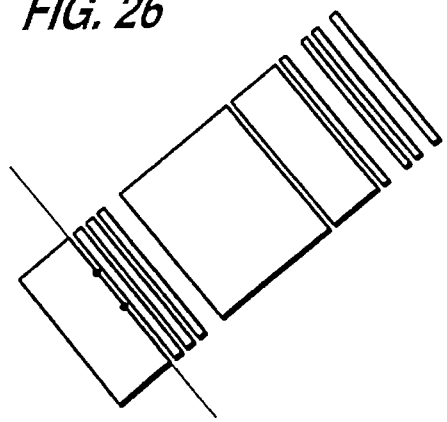

If at least two start patterns or two stop patterns are found, then the orientation of the symbol can be determined. For example, as shown in FIG. 25, points p1 and p2 represent the locations of two start patterns, and points q1 and q2 represent the locations of two stop patterns. A straight line perpendicular to the rows of the symbol can be drawn through the two points as shown in FIG. 26 to determine the orientation of the symbol.

Although theoretically two such points are sufficient to determine a straight line, the decoder will try to accumulate more than two start or stop patterns, up to a predetermined limit. The decoder will then select the two "best" patterns for finding the orientation of the symbol. The best patterns are considered to be those start or stop patterns which have fewest defects and are as far apart as possible.

If the decoder is unable to detect two start patterns or two stop patterns in the foregoing manner, then the decoder will alter the scan looking for start or stop patterns in another direction, for example, a direction perpendicular to the present direction. If the decoder is still unable to detect at least two start patterns or two stop patterns, then the camera takes a new picture and the decoding process starts over.

Figure 27:
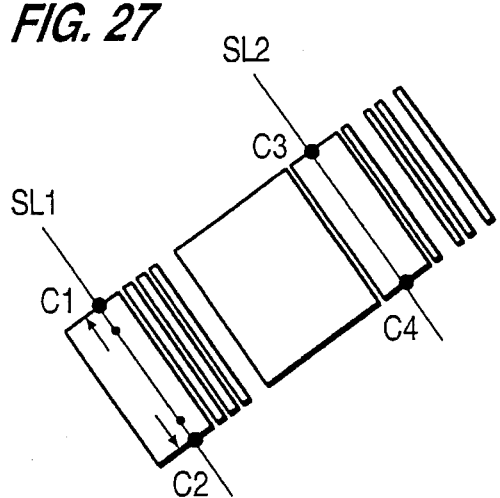

If the decoder is successful in detecting at least two start patterns and two stop patterns in the image data, the decoder then attempts to determine the location of four control points C1, C2, C3, and C4 at the top and bottom of the start and stop patterns as shown in FIG. 27. For the start pattern, this is done by first determining a straight line SL1 through the center of the first bar of the start pattern. Then starting from two points located inside the first bar, the decoder searches outward along the line SL1 for the edges of the symbol. The edges of the symbol are determined by a large change in the gray level of the pixel data along this line. The two edge points found in this way are the control points C1 and C2. A similar procedure is carried out for the stop code word along line SL2 to find the other two control points C3 and C4. Knowledge of control parts C1–C4 and/or straight lines SL1 and SL2 within a reference axis superimposed over CCD/CMD cameras field of view can be used to relate the symbol's position to the reference axis for the pattern/ generator and rotator/translator.

The edges of the symbol are determined by traversing a line between two points as in FIG. 26 and searching for an edge along the line. In particular, the slope of the line is first determined, and starting from the first end point of the line, the value or the gray level of a current pixel on the line is compared with the value of the previous pixel. If the compared value is greater than or equal to a predetermined threshold value, then the edge is at the current pixel position. If the compared value is less than the predetermined threshold value, then the current pixel position is incremented according to the slope of the line and the incremented position becomes the new current pixel position. The current pixel position (the incremented position) is compared with the last pixel position. This procedure is continued until either an edge is found, or the current pixel position reaches the last end point of the line.

Once the edges have been determined a stop pattern is searched for in the edge location data. To find the stop pattern, eight successive numbers are read. The first number, however, must be a bar. If it is not, then the next eight successive numbers are read. If the first number is a bar, then the first four numbers are determined. The eight numbers are normalized by divided by the sum of eight values, multiplying by 17 and then rounding to the nearest decimal point of interest. The result is then compared to the start and stop patterns. If it matches one of those then the pattern is found. If any of the conditions are not met, then the next eight successive numbers are read.

Figure 28:
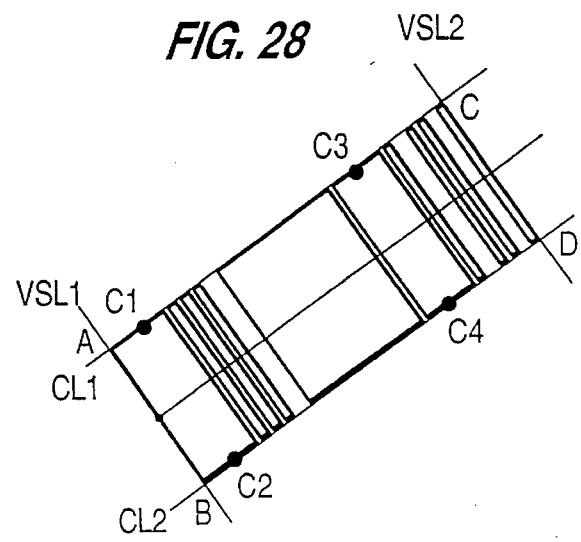

If multiple stop or start commands are found, then the two best start or stop patterns are selected. Based on the two best start and stop patterns selected, the four end points A, B, C, D shown in FIG. 28 are determined.

To determine the four end points, a line is drawn passing through the middle of the first bar of both start and stop patterns. An end point lies at a point having a large gray-level change on each line. Therefore, an end point exists along the lines VSL1, VSL2, CL1, and CL2 at the top and bottom of the first bar of the start pattern and at the top and bottom of the last bar of the stop pattern. Knowledge of end points A-D and/or lines VSL1, VSL2, CL1 and CL2 within a reference axis superimposed over the CCD/CMD cameras field of view can be used to relate the symbol's position to the reference axis for the pattern/generator and rotator/translator.

Having determined the location and orientation of the symbol, the present invention can derive pattern control signals (i.e., the displacement signal) in order to rotate and/or transtate the light beam pattern to improve symbol readability. Additionally, the present invention may derive pattern control signals which cause the pattern generator to derive new coordinate control signals to alter the light beam pattern.

(5) External Feedback Signals

The present invention provides the capability to receive feedback signals from sources external to the scanning system. As an example, the method illustrated in the flow-chart of FIG. 29 uses several external feedback signals in an application of the present invention to a conveyor belt system. The conveyor belt application assumes that the scanning system is fully or semi-automated, that is, that the scanning system self-adjusts to read symbols. Articles on the conveyor belt may have symbols at almost any readable orientation relative to the scanning system. Furthermore, one and/or two dimensional symbols may be used for each article.

Figure 29:
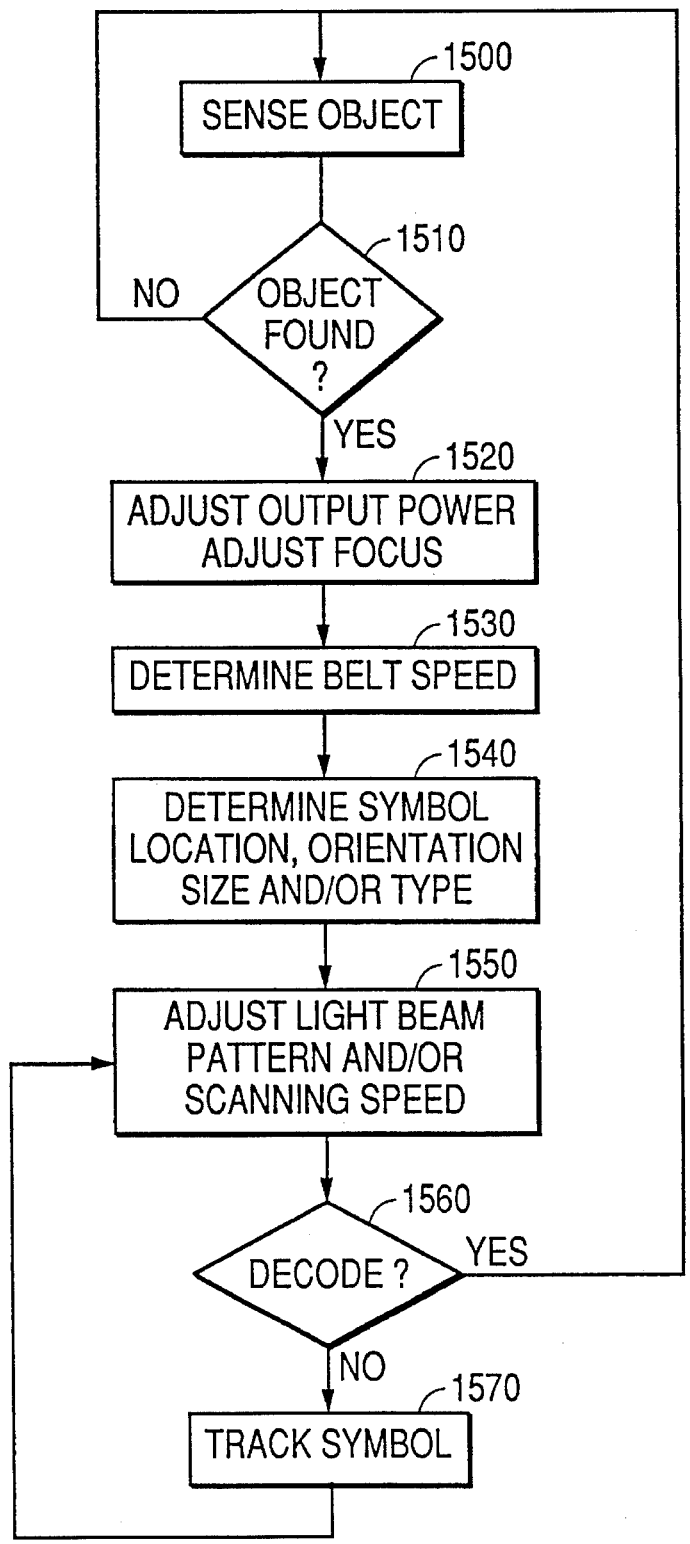
FIG. 29 is a flowchart illustrating the operation of the scanning system of FIG. 1 in a conveyor belt application.

In FIG. 29, the scanning system waits until an article is sensed by a proximity sensor at a predetermined location before beginning to scan for a symbol (1500 and 1510). Articles may have different shapes and sizes, and the scanning system must adjust output power, scanning speed and/or focusing accordingly (1520). In order to track the article as it moves along the conveyor belt, the scanning system must recognize the speed of the belt (1530). The symbol(s) on the article are located, and the characteristics of the symbols are analyzed by the means previously discussed (1540). In response to determinations regarding symbol location, orientation, size, type, etc., the scanning system may adjust the scanning speed, shape and/or orientation of the light beam pattern as well as the location of the light beam pattern (1550). The scanning system then obtains a scan and attempts to decode the symbol (1560). If decoding is successful, then the scanning system awaits the next article. If, however, the decoding is unsuccessful, the symbol is tracked on the basis of the previous location, orientation and belt speed (1570). Successive attempts to decode the symbol may include further adjustments to focus, output power, and the light beam pattern (1550). This method allows a moving symbol to be tracked and decoded. The conveyor belt can run at any practical speed without the need for speed stabilizing or a synchronizing system.

Figure 30:
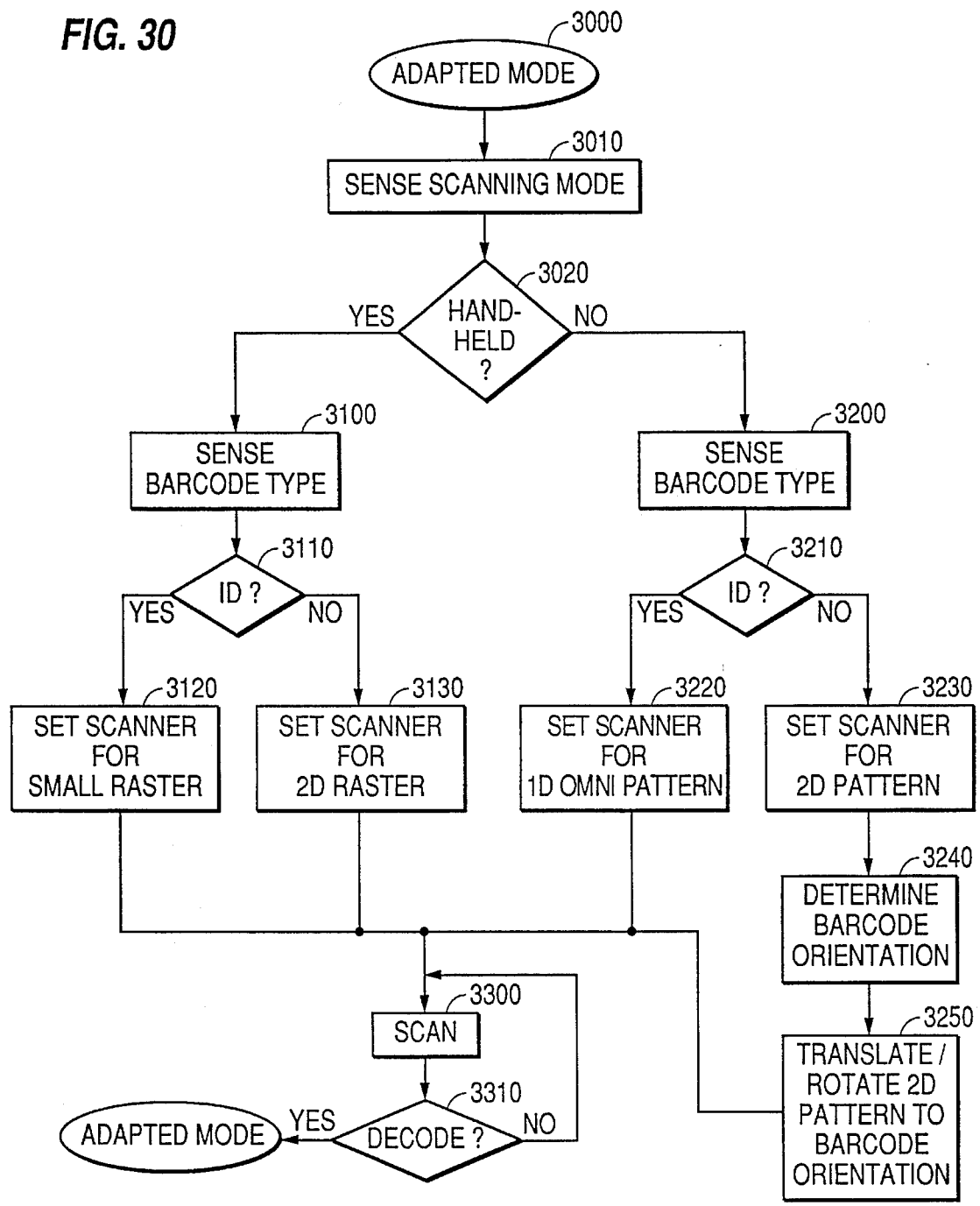
FIG. 30 is a diagram illustrating the operation of the scanning system of FIG. 1 in a scan lamp application.

As another example, the method illustrated in FIG. 30 uses internal and external feedback signals in an application of the present invention to a mountable scanner. The mountable scanner may be used in the hand-held or the fixed modes of operation previously discussed. Additionally the mountable scanner may be used to scan and decode one-dimensional (1D) and two dimensional (2D) symbols. Finally, the mountable scanner is assumed to have already "learned" optimal light beam patterns for each alternative discussed below.

The mountable scanner operates in an adapted mode, that is, a scanning mode initially set upon start-up, or a scanning mode previously used to decode symbols (3000). The mountable scanner senses its current mode of operating (3010) and determines whether it is being used in a hand-held mode (3020). The current mode of mountable scanner operation may be indicated by internal sensors or by an external input.

If the mountable scanner senses that it is currently being used in a hand-held mode (3020-yes) it then senses or determines symbol type (3100). Symbol type may be determined by an external input or by a scan lamp determination on the basis of a series of preliminary scans. For example, two-dimensional symbol like PDF417 indicate the rows and columns where code words are placed. One-dimensional symbols do not have this information. If it is determined that a one-dimensional symbol is present (3110-yes), the mountable scanner recalls from memory a previously "learned" small raster pattern optimized to read a one-dimensional symbol in hand-held mode, and sets the scanner accordingly (3120). Alternatively, if a two-dimensional symbol is sensed (3110-no), the mountable scanner recalls from memory a "learned" two-dimensional raster optimized to read a two-dimensional symbol in hand-held mode and sets the scanner accordingly (3130).

Similarly, if the mountable scanner does not sense that it is currently being used in a hand-held mode (3020-no), it proceeds in fixed mode and senses a symbol type as already discussed (3200). If a one-dimensional symbol is sensed (3210-yes), the mountable scanner recalls from memory a "learned" omni-directional pattern optimized to read one-dimensional symbols in fixed mode (3220). Alternatively, if a two-dimensional symbol is sensed (3210-no), the mountable scanner recalls from memory a "learned" two-dimensional pattern optimized to decode two-dimensional symbols in fixed mode (3230).

Once a two-dimensional symbols has been sensed in fixed mode, the mountable scanner will determine the symbol orientation (3240) and will transtate and rotate the pattern to effect maximum readability (3250). The steps of determining symbol orientation (3240) and translating/rotating the two-dimensional pattern (3250) are not typically required in hand-held mode where a user can physically alter the relative orientation of symbol and mountable scanner.

After selecting a light beam pattern from one of steps (3120), (3130), 3220) or (3250), the mountable scanner scans the symbol (3300) until successful decode is acquired (3310). Once a successful "decode is acquired the mountable scanner remains in adapted mode until reinitialized, or until a system feedback signal changes.

H. VARIABLE SCAN ANGLE

Figure 9A:
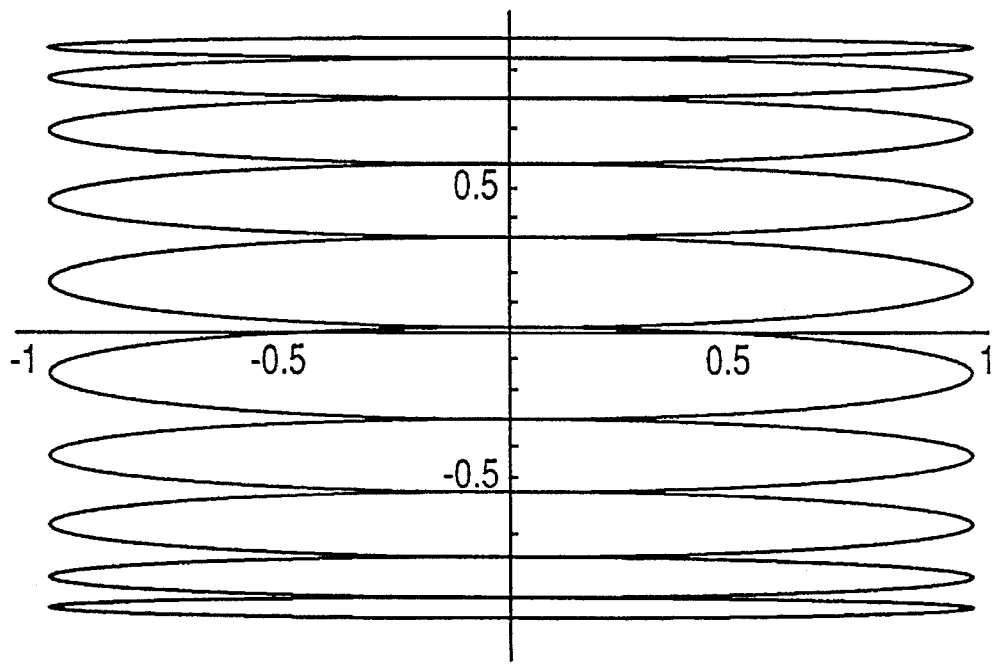
FIG. 9(a) is a diagram illustrating a standard (synchronous) raster light beam pattern.
Figure 9B:
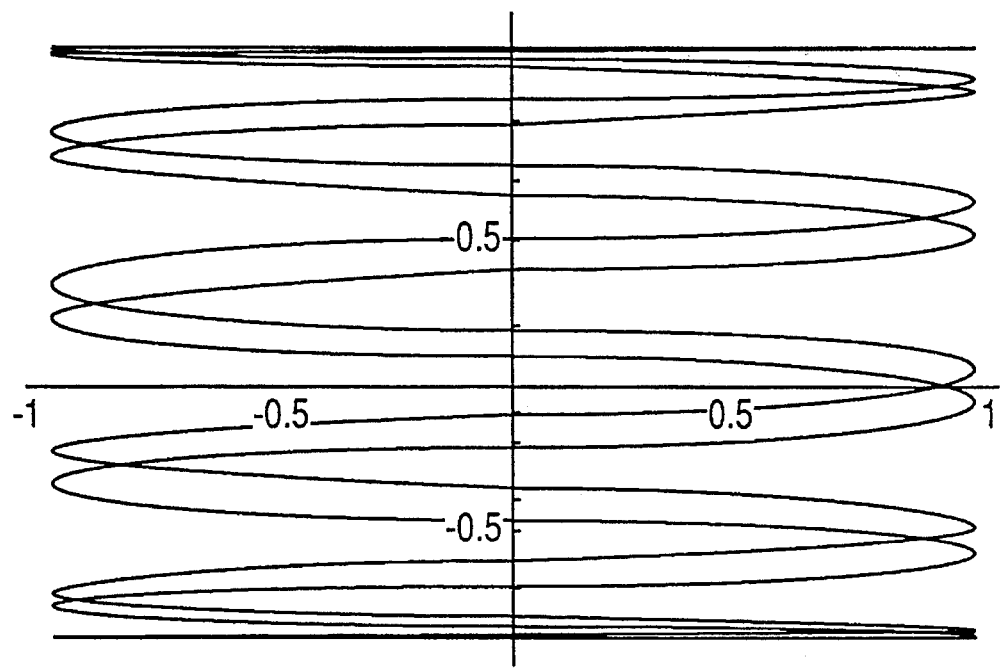
FIG. 9(b) is a diagram illustrating a jittering (asynchronous) raster light beam pattern.

FIGS. 9(a) and 9(b) illustrate the standard (synchronous) raster and (asynchronous) jittered raster typical of light beam patterns generated by the present invention. Each of these patterns assumes that every portion of a symbol is equally apparent within the scanned area. That is, rasters direct scan lines in symmetrical proportion across the area scanned by the raster.

However, many applications exist where one portion of the symbol is less "readable" than another. Such symbols are referred to as truncated symbols. A truncated symbol may be one at an angle, in the same plane, to the horizontal scan lines of the raster such that a portion of the symbol is not scanned, or may be a symbol attached to a curved or angular surface such that a portion of the symbol runs away from the scanning system. In order to read truncated symbols, it is desirable to have an increased number of horizontal raster lines scanning the truncated symbol portions to increase resolution.

This asymmetry of horizontal raster scan lines can be achieved by converting the conventional raster scanning patterns into one having a variable scan angle. This can be done by varying the amplitude, or the amplitude and/or frequency of the y(t) coordinate control signal relative to the x(t) coordinate control signal.

Figure 31A:
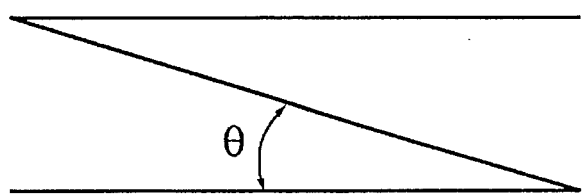
FIG. 31 is a diagram illustrating a variable angle raster.
Figure 31B:
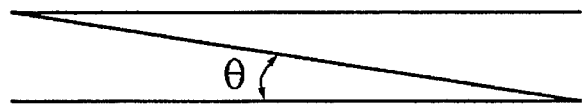
Figure 31C:
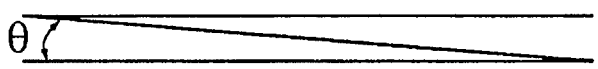

For example, if the ratio of the x(t)/y(t) amplitudes is fixed at two, the raster shown in FIG. 31(a) would be obtained. In FIGS. 31(a)–31(c), the distance between adjacent horizontal scan lines, and the angle of the return raster, θ, are a function of the amplitude B of the y(t) coordinate control signal expressed as y(t)=B sin ($\omega_2$t) relative to the amplitude A of the x(t) coordinate control signal expressed as x(t)=A sin ($\omega_1$t). Thus, as the ratio of A/B increases the distance between adjacent horizontal scan lines and angle e decrease, as successively shown in FIGS. 31(a)–31(c).

If instead of keeping the amplitude ratio constant, it is varied as a function of time, such as varying the ratio by means of a sawtooth waveform generator, then a raster shown by the combination of FIGS. 31(a)–31(c) is obtained. A similar result can be obtained by varying the ratio of $\omega^1/\omega_2$. This method of varying coordinate control signal amplitude and/or frequency ratios can be applied in complex two-dimensional light beam patterns as well as rasters. A functional diagram of circuitry to accomplish this method is shown in FIG. 32.

Figure 32:
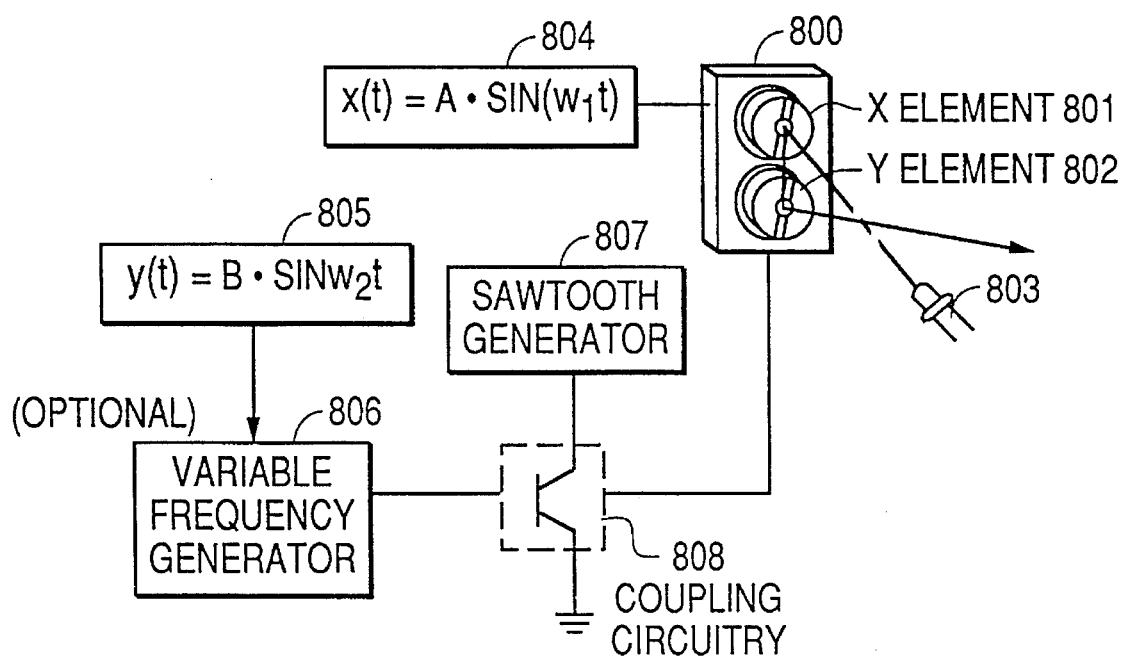
FIG. 32 is a schematic block diagram illustrating an embodiment of a circuit operable within the pattern generator of FIG. 1 to obtain the variable scan angle shown in FIG. 31.

In FIG. 32, a dual element X/Y scanning head 800 of the type previously discussed is used to independently direct a light beam from laser 803 in the X and Y directions by means of X-element 801 and Y-element 802. The X-element 801 is driven by a first signal source 804 having the form x(t)=A*sin ($\omega_1$t). The Y-element 802 is driven by a second signal source 805 having the form y(t)=B*sin ($\omega_2$t) where $\omega_2$ may be varied with respect to $\omega_1$ by variable frequency generator 806 and where amplitude B may be varied with amplitude A by sawtooth waveform generator 807 through coupling means 808.

I. SYNCHRONOUS DIGITIZERS

Figure 33:
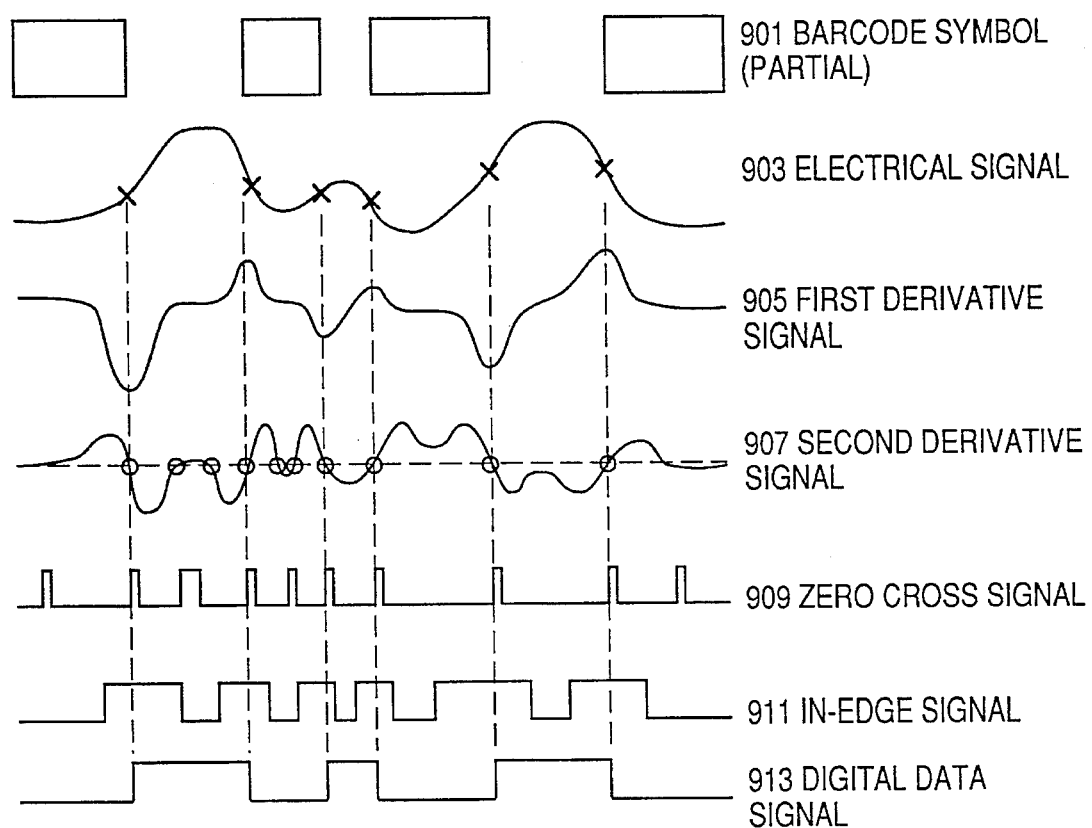
FIG. 33 is a diagram illustrating an electrical signal corresponding to a transduced reflected portion of a light beam scanning a barcode symbol, and digital data control signals derived thereform.

As described above, when a light beam scans a symbol the reflected portion of the light beam is transduced by the scanning system using well known circuitry into an electrical signal which varies in level in accordance with variations in the intensity of the reflected light beam portion. FIG. 33 illustrates part of a barcode symbol 901, an electrical signal 903 resulting from a transduced reflected light beam portion of a light beam scanning barcode symbol 901, a first derivative signal 905 of the electrical signal 903, a second derivative signal 907, a zero cross signal 909, an In-edge signal 911, and a pulse-width modulated digital data signal 913.

Zero cross signal 909 comprises a series of pulses, each pulse having a predetermined width and being generated when the level of the second derivative signal 907 goes from positive to negative or from negative to positive. In-edge signal 911 comprises a series of pulses generated when the value of the first derivative signal 903 is below a predetermined lower threshold or above a predetermined upper threshold. Zero cross signal 909 and In-edge signal 911 are digital data control signals derived from the second and first derivatives of the electrical signal 903, respectively.

If the light beam is properly focused on the barcode symbol 901, the transition points between high and low levels of the electrical signal 903 closely relate to the true spatial transitions between elements (bars and spaces) in barcode symbol 901. Transition points in electrical signal 903 are also called inflection points and are shown by the X's in FIG. 33.

Inflection points in electrical signal 903 are also defined as maximas and minimas (peaks) in the first derivative signal 905. Analog circuitry detects inflection points by selecting zero crossings in the second derivative signal 907 which coincide with peaks (positive and negative) in the first derivative signal 905. Zero crossings in the second derivative signal 907 are encircled by O's in FIG. 33. Some of the zero crossings in the second derivative signal 907 occur at points which do not coincide with peaks in the first derivative signal 905 (i.e., inflection points in the electrical signal 903). This result creates problems for digitizer circuits which detect zero crossings in the second derivative signal 906 in order to find inflection points in the electrical signal 903.

Digitizers typically incorporate a zero crossing detector which produces zero crossing signal 909 in response to zero crossings in the second derivative. Pulses in the zero crossing signal 909 and In-edge signal 911 (which indicates maximas and minimas in the first derivative signal 905) are used to set a flip-flop which indicates an inflection point in the electrical signal 903.

Figure 34:
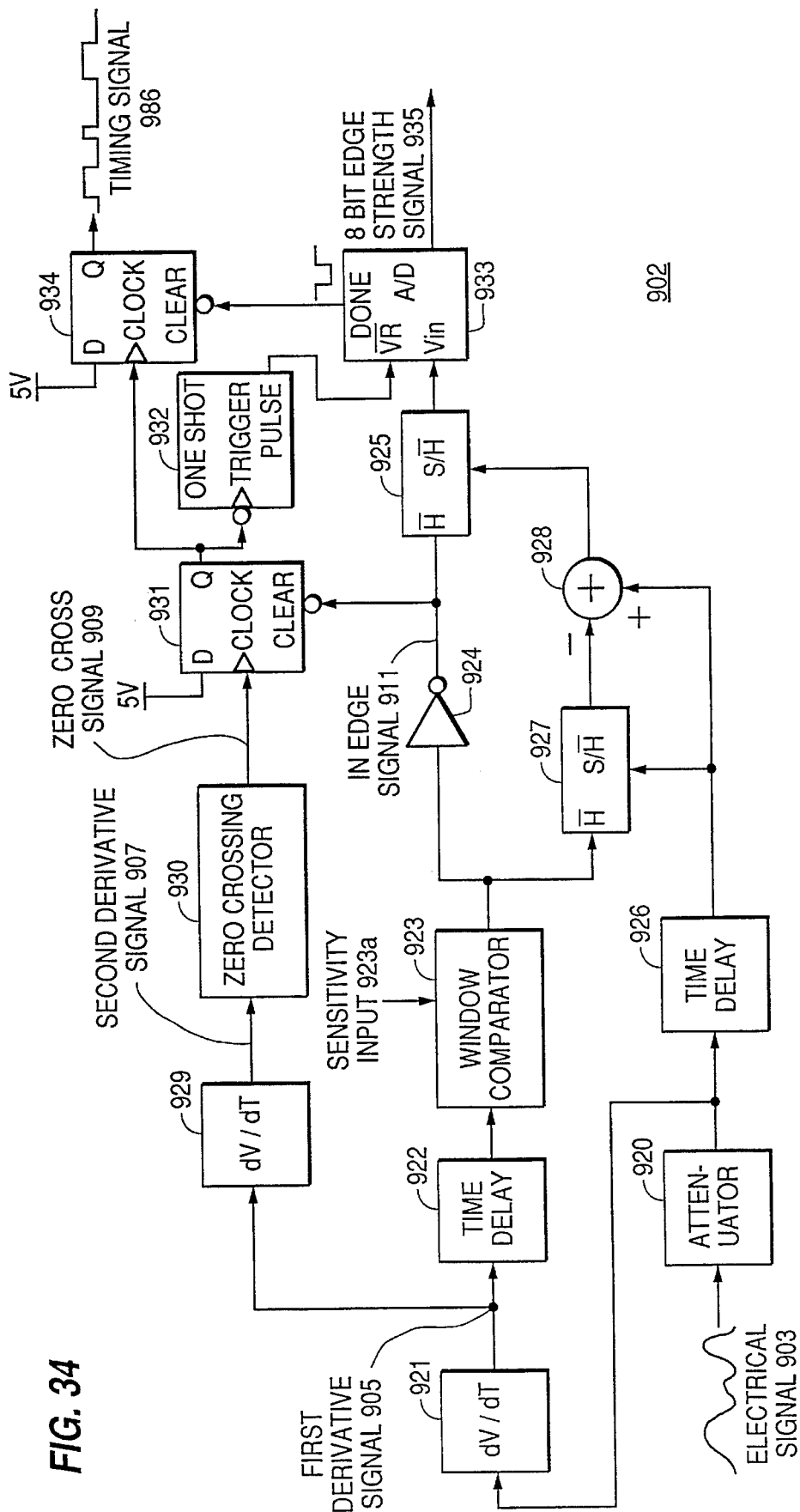
FIG. 34 is a schematic diagram of a conventional multi-bit digitizer which is used in the scanner of FIG. 1.

The foregoing signals are typically derived and implemented in a multi-bit digitizer shown, for example, in FIG. 34. The incorporated "multi-bit digitizer application" describes in detail the circuit shown in FIG. 34. The following discussion is included for purposes of completeness. In FIG. 34, electrical signal 903 is applied to an attenuator 920 which reduces the level of electrical signal 903 to a predetermined level. The attenuated electrical signal is passed through a first differentiation circuit 921 to obtain first derivative signal 905. First derivation signal 905 is passed through a second differentiation circuit 929 to obtain second derivative signal 907.

First time delay element 926 delays the attenuated electrical signal by a period corresponding to the processing delay introduced by the first and second differentiation circuits 921, and 929. Second time delay element 922 delays the first derivative signal 905 by a period corresponding to the processing delay introduced by the second differentiation circuit 929.

After time delay element 922, the first derivative signal 905 is passed through a window comparator circuit 923 which produces a pulse-width modulated control signal which is high for first derivative signal levels within the predetermined upper and lower thresholds and low for first derivative signal levels outside the predetermined thresholds. The range between the upper and lower thresholds (or window) is determined by a sensitivity input 923a to window comparator 923. The resulting pulse-width modulated control signal In-edge indicates peak portions of the first derivative signal 905. This signal is inverted by inverter 924 to produce In-edge signal 911 which is applied to flip-flop 931.

The multi-bit digitizer 902 shown in FIG. 34 generates a pulse-width modulated timing signal 936 and an edge strength signal 935. The derivation of edge strength signal 935 by first sample/hold circuit 927, adder 928, second sample and hold circuit 925, one-shot circuit 932, and A/D converter 933 is set forth in the incorporated "multi-bit digitizer application."

Timing signal 936 is generated by second flip-flop 934 which is "clocked" by first flip-flop 931. First flip-flop 931 is "clocked" by zero cross signal 909 which is produced by zero crossing circuit 930. Zero crossing circuit 930 detects zero crossing in the second derivative signal 907. First flip-flop 931 is cleared by In-edge signal 911. Thus, pulses in the timing signal 936 correspond to zero crossings in the second derivative signal 907 which coincide with peaks in the first derivative signal 911. The incorporated "Multi-bit Digitizer application", Ser. No. 862,471, filed Apr. 2, 1992, describes in detail the method by which edge strength signal 935 and timing signal 936 combine to produce a pulse-width modulated digital data signal 913 corresponding to the spatial relationship of symbol elements scanned by the light beam.

The foregoing method and apparatus for generating digital data signal 913 works well for electrical signals having low noise. Unfortunately, the zero cross signal 909 and In-edge signal 911 are very sensitive to noise in electrical signal 903. Erroneous pulses in these two signals result when noise transients are detected as zero crossings in the second derivative signal 907, or as peaks in the first derivative signal 905.

According to one embodiment of the present invention, the above described difficulties in generating an accurate digital data signal from a noisy electrical signal can be overcome by using the zero cross and In-edge signals as inputs to a synchronous state machine. The following state machine will select zero crossings more intelligently than the noise susceptible flip-flops of FIG. 34.

Figure 35:
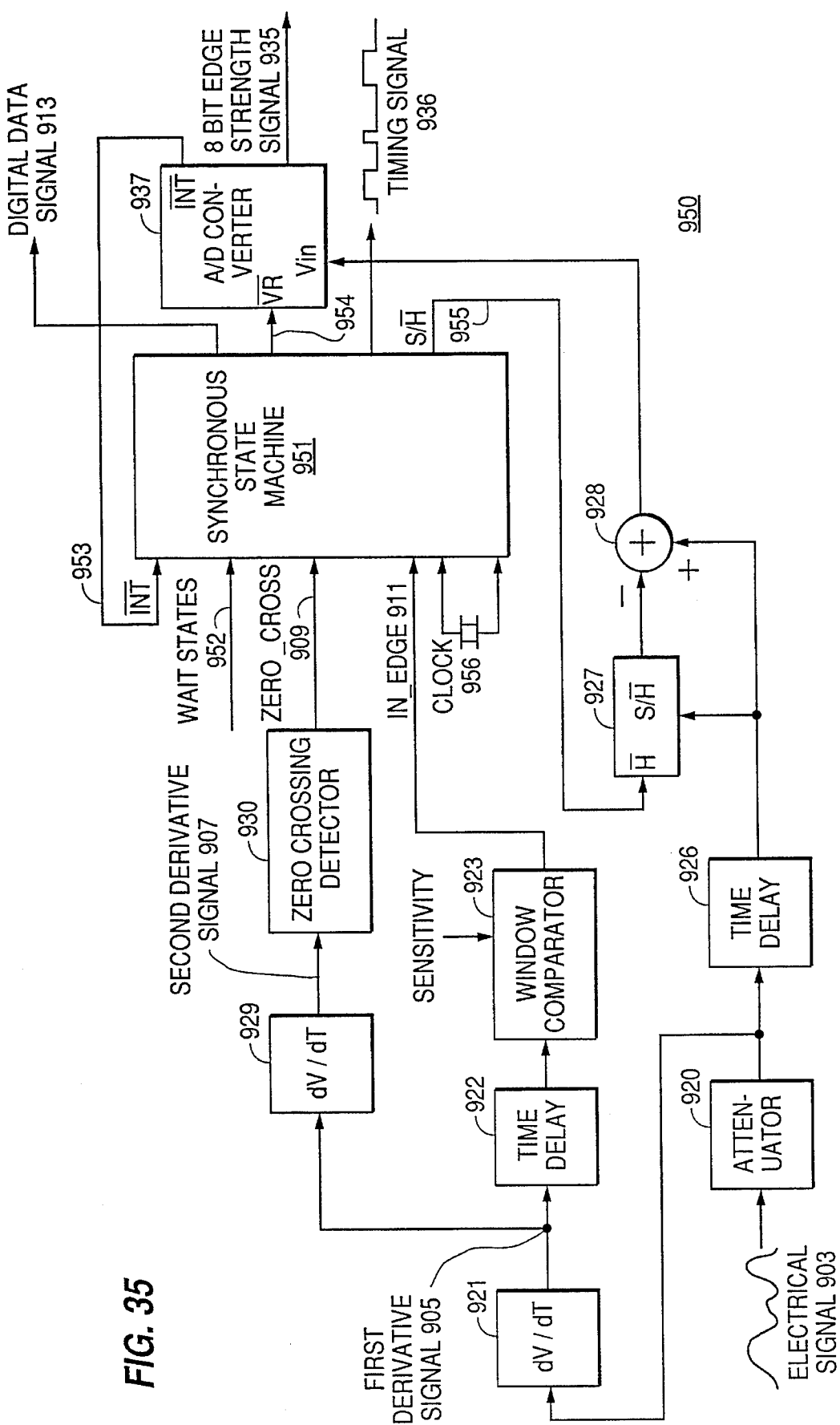
FIG. 35 is a schematic diagram of a multi-bit digitizer according to the present invention, the digitizer having a synchronous state machine and being used in the scanner of FIG. 1.

The multi-bit digitizer 950 shown, for example, in FIG. 35 includes synchronous state machine 951 driven by clock 956. The synchronous state machine 951 is typically implemented in a programmed array logic (PAL) by well known techniques which convert the logic of the state diagram shown in FIG. 37 into a single integrated circuit. Other elements of multi-bit digitizer 950 function as similarly labelled elements previously described with reference to multibit digitizer 902 of FIG. 34.

Synchronous state machine 951 receives as input signals In-edge signal 911 (IE), zero cross signal 909 (ZC), A/D converter ready signal 953 (INT), and wait states signal 952 (Wt). Synchronous state machine 951 generates as output signals A/D write pulse signal 954 (WR), edge strength calculation control signal 955 (S/H), and digital data signal 913.

Figure 36:
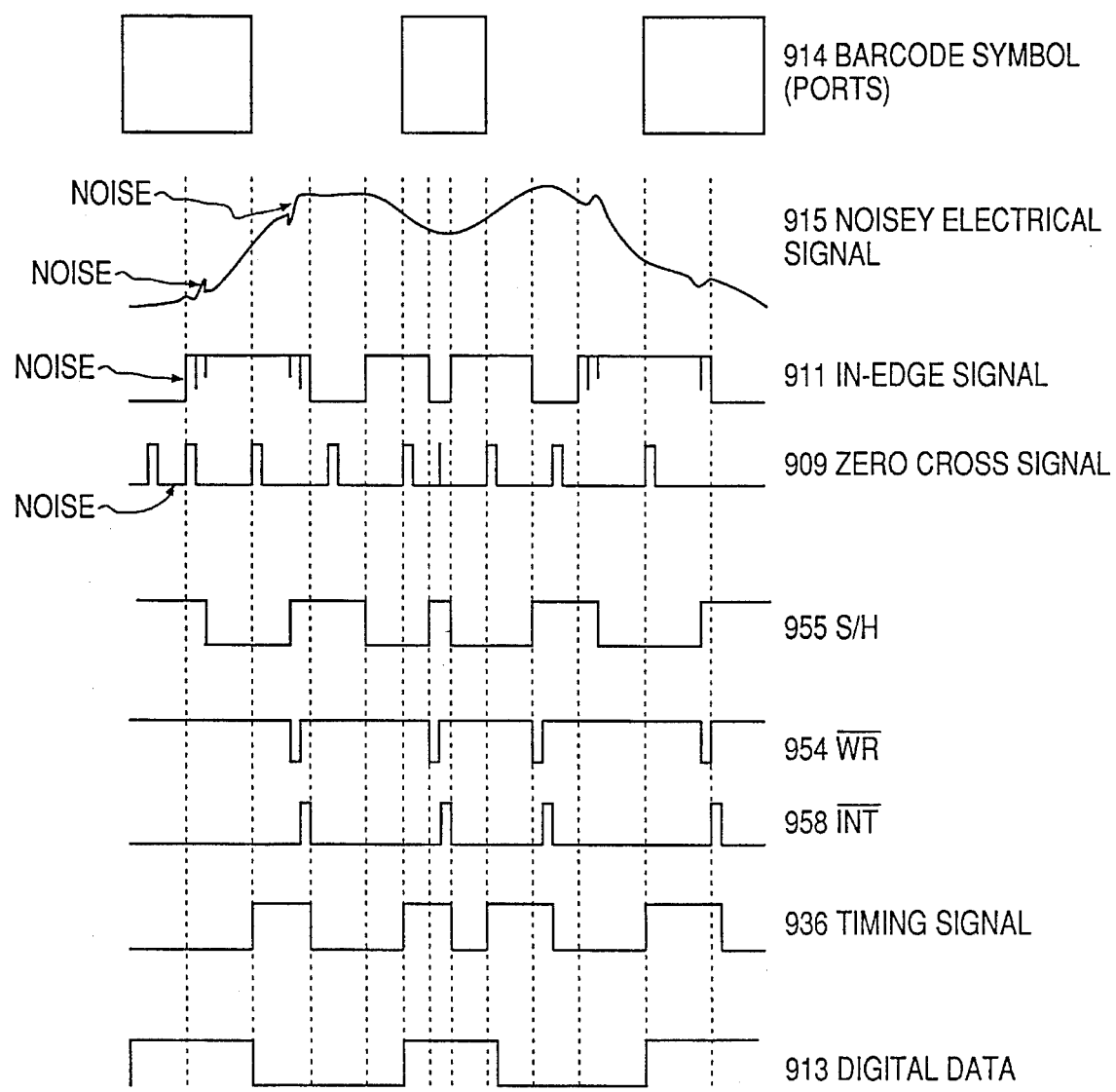
FIG. 36 is a diagram illustrating a noisy electrical signal corresponding to a transduced reflected portion of a light beam scanning a barcode symbol, and digital data control signals derived from the multi-bit digitizer shown in FIG. 35.

The relationship between these signals is illustrated in FIG. 36. Noisy electrical signal 915 results from a reflected portion of a light beam scanning barcode symbol 914 which is transduced into analog electrical form. In-edge signal 911 and zero cross signal 909 are correspondingly corrupted with false indications caused by noise transients in electrical signal 915.

The adverse effects of noise in the electrical signal 915 may be countered by signal filtering and intelligent zero crossing selection performed with the logic of synchronous state machine 951. This is achieved by ignoring signal changes in zero cross signal 909 and In-edge signal 911 having too short of a duration. In other words, transitions in zero cross signal 909 and In-edge signal 911 are examined a second time after a signal transition is detected to be sure that the signal level has settled to a stable value. For example, In-edge signal 911 is time filtered in the synchronous state machine by having the state machine wait a pre-determined waiting period (number of waiting states) after a transition detection before acquiring a signal level value. In this manner, zero crossings are selected outside the "chatter period" during which In-edge signal 911 rises or falls do to a noise transient. As a result, invalid zero crossings which typically occur during the chatter period are not selected.

Figure 37:
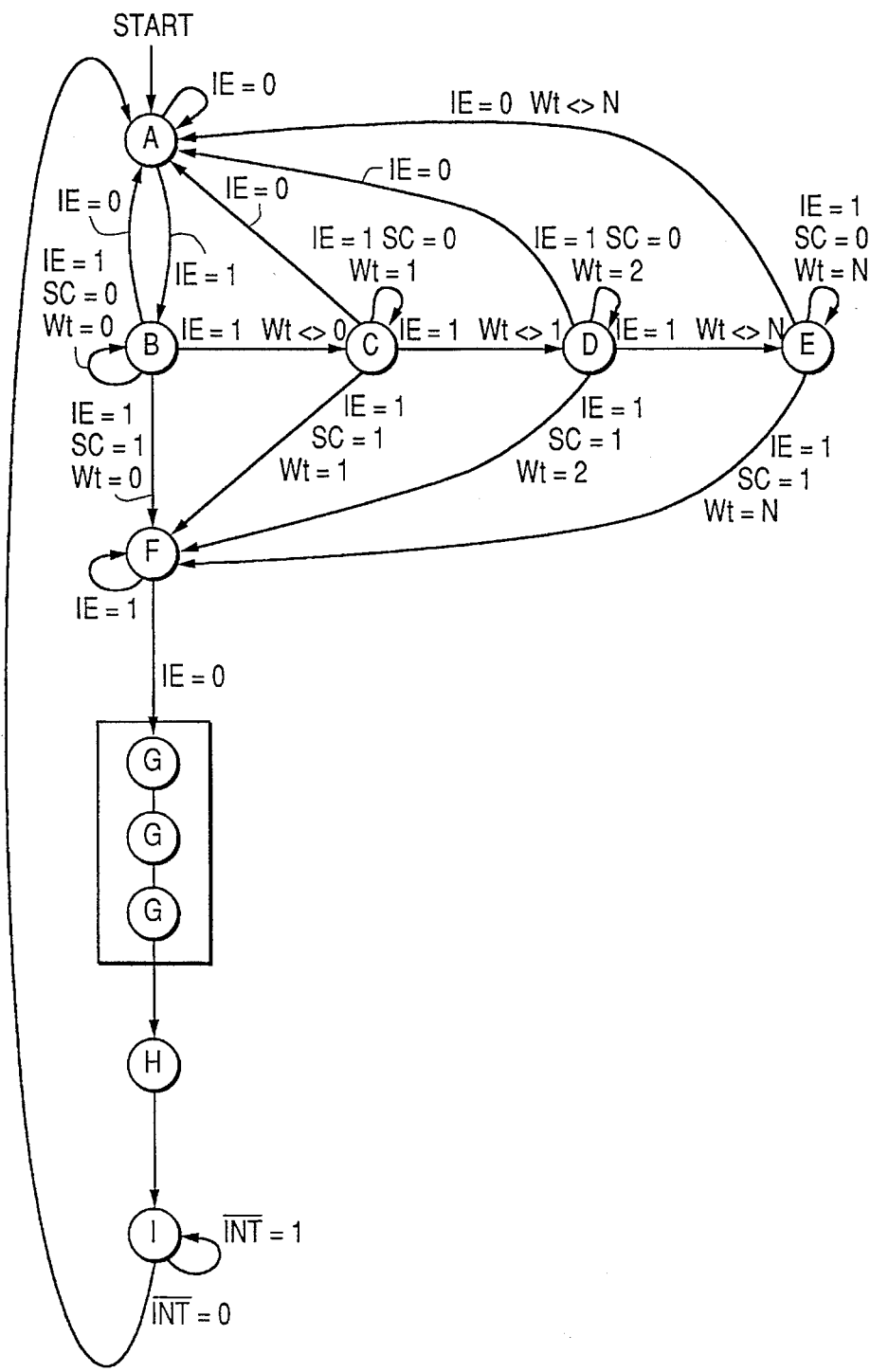
FIG. 37 is a logic diagram illustrating the logic states in the synchronous state machine of the multi-bit digitizer shown in FIG. 35.

The derivation of S/H signal 955, WR 954, INT 953 and timing signal 936 is shown, for example, in FIG. 37 which illustrates a logic diagram (Moore implementation diagram) for the synchronous state machine 951 shown in FIG. 37. Upon starting, the synchronous state machine (SSM) cycles in state A until In-edge signal 911 (IE) goes high (1). When IE=1, the SSM goes to state B where it remains so long as IE=1, and zero crossing signal 909 (ZC) and wait states signal 952 (Wt) remain low (0) If IE goes low while in state B, the SSM returns to state A.

Progression in the state machine logic diagram beyond state B ultimately depends on zero cross signal 909 (ZC) going high. Upon IE=1 and ZC=1, the SSM moves from state B to state F.

However, the SSM will "wait" in a predetermined number of waiting states for ZC to go high. For example, as shown in FIG. 36, when IE=1 and wait state signal 952 (Wt) becomes non-zero, the SSM enters State C. As Wt increments from 1 to N, the SSM waits in one of a plurality of waiting states (state D for Wt=2, . . . state E for Wt=N) until either ZC goes high or IE goes low. If IE goes low in any one of the plurality of waiting states, the SSM returns to state A. However, if IE remains high and ZC goes high in any one of the plurality of waiting states, the SSM enters state F.

The number of waiting states selected and the predetermined waiting period between each waiting state is determined on the basis of expected noise transients duration and scanning system parameters such as beam width, barcode symbology, etc. The "waiting" by the SSM in the plurality of waiting states allows IE to settle at a stable value for at least one predetermined delay period before ZC is sampled.

Once in state F, the SSM will cycle in state F until IE goes low again. When IE=0 in state F, the SSM enters state G which is an unconditional pause state (typically 300 ns) during which A/D converter 937 sets up to write (output) data.

Following the predetermined pause period during which A/D converter 939 sets up, the SSM enter state H during which the A/D converter ready signal 953 (INT) settles. Following the predetermined settling period, the SSM enters state I where it cycles until INT goes low at which point the SSM returns to state A.

In state A, the SSM outputs WR=1, S/H=1 and timing=0. In any one of the waiting states (B-E in FIG. 37), the SSM outputs WR=1, S/H=0, and timing=0. In state F, the SSM outputs WR=1, S/H=0 and timing=1. In state G, the SSM outputs WR=0, S/H=0, and timing=1. Finally, in states H and I, the SSM outputs WR=1, S/H=1 and timing=1.

As a result, the timing signal output is high when IE=1 and ZC=1 after at least one predetermined waiting period, A/D converter 937 is write disabled everywhere but state G during which write data is being set up, and the edge strength calculation control signal is output only when the A/D converter 937 indicates that it has a converted data value ready for output (Int=1).

Figure 38:
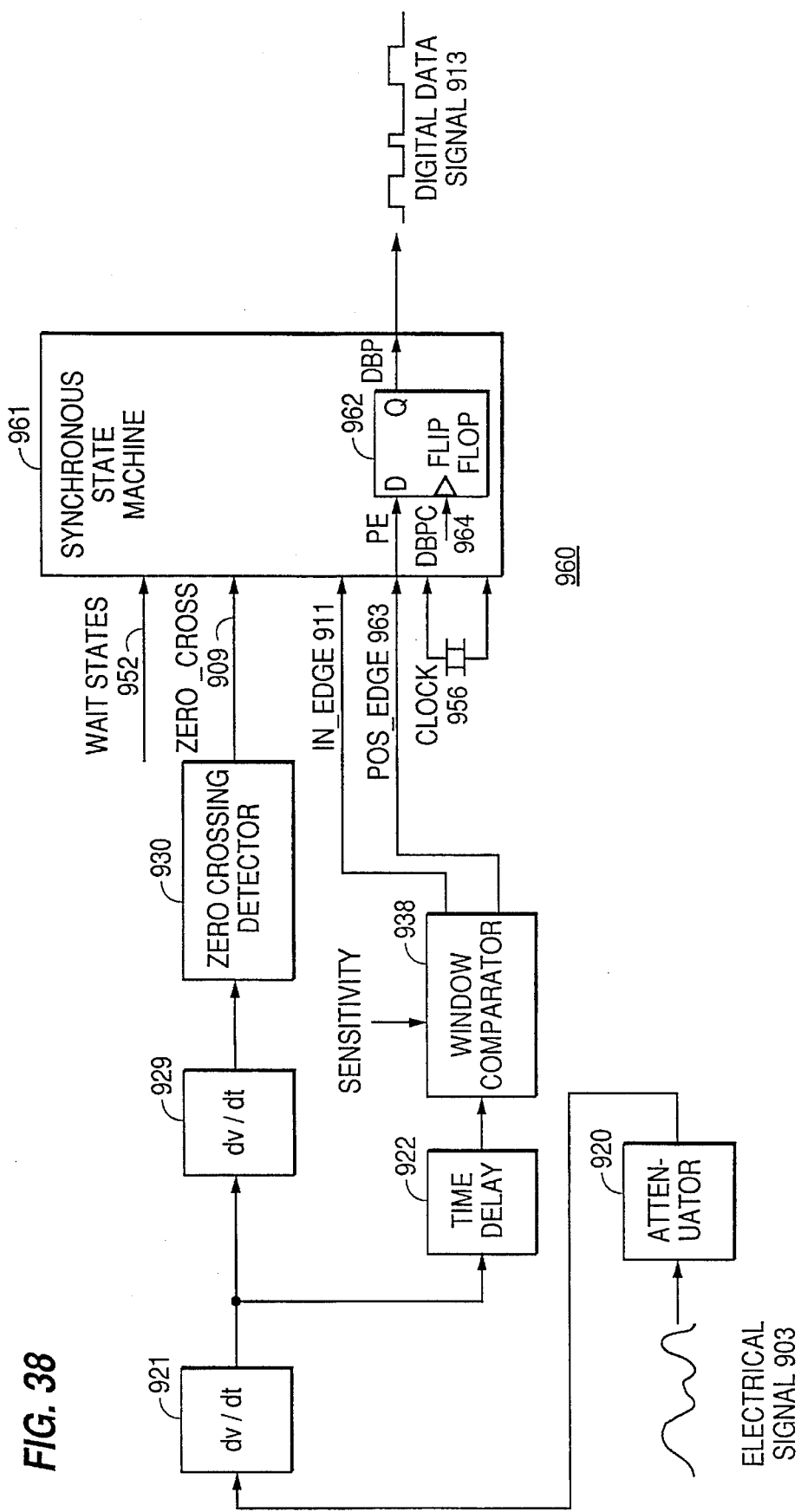
FIG. 38 is a schematic diagram of a single-bit digitizer according to the present invention, the digitizer having a synchronous state machine and being used in the scanner of FIG. 1.
Figure 39:
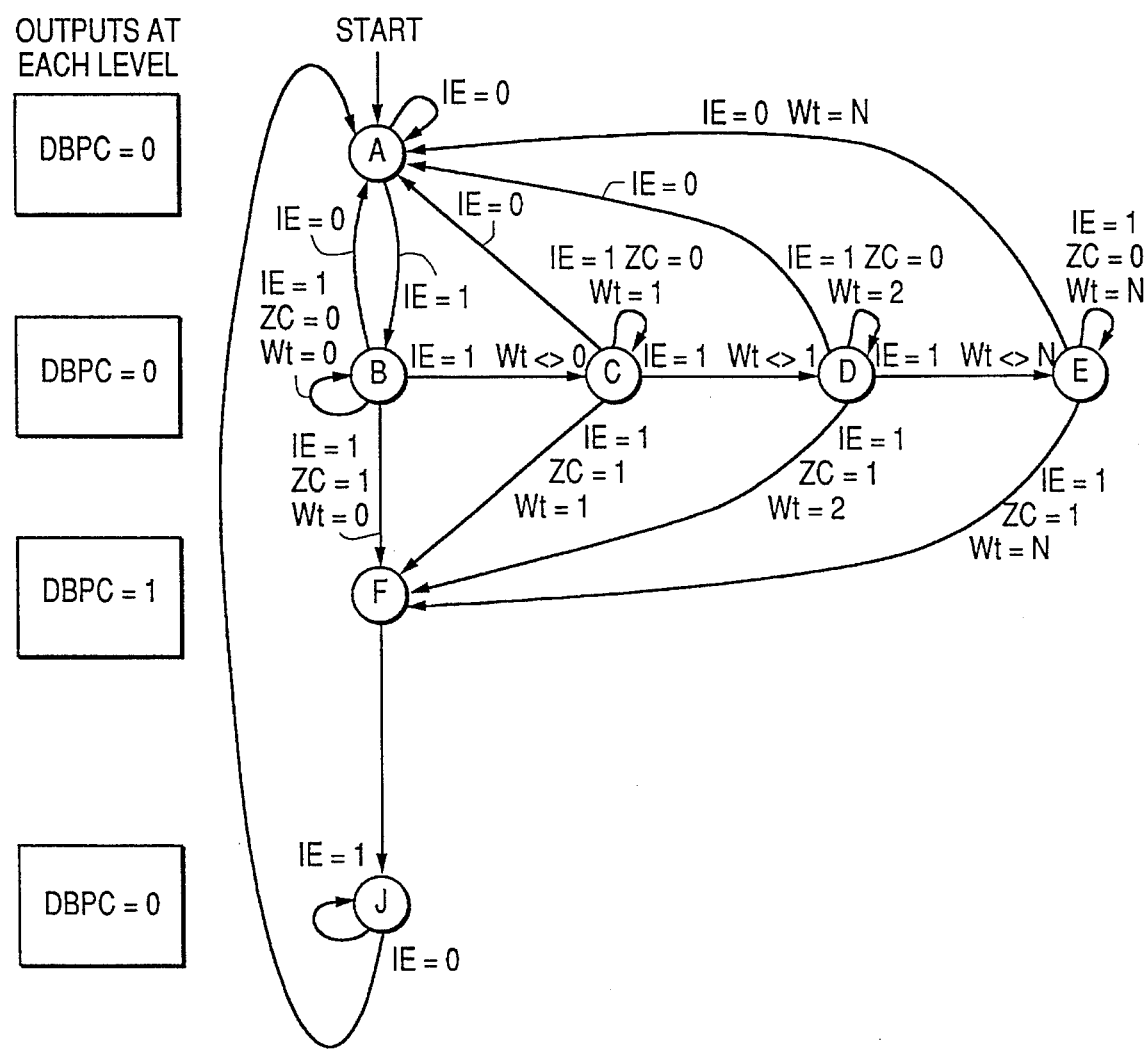
FIG. 39 is logic diagram illustrating the logic states in the synchronous state machine of the single-bit digitizer shown in FIG. 38.

Another embodiment of the present invention applied to a single-bit digitizer is shown, for example, in FIGS. 38 and 39. The single-bit digitizer 960 shown in FIG. 38 includes synchronous state machine 961 driven by clock 956. In addition to Wait States signal 952 (Wt), zero cross signal 909, and In-edge signal 911 previously described, synchronous state machine 961 receives positive (Pos) edge signal 963. Pos-edge signal 963 is generated by window comparator 938 which includes a conventional positive edge detection circuit. Other elements in single-bit digitizer 960 function like similarly labeled elements described with respect to multi-bit digitizer 950 in FIG. 35.

The PAL which implements the state machine logic diagram shown in FIG. 39 also incorporates logic which implements R the function of flip-flop 962. The output of flip-flop 962 is clocked by digital bit pulse control (DBPC) signal 964 which is generated within synchronous state machine 961. DBPC signal 964 clocks a 1 into the flip-flop 962 when zero cross (ZC) signal 909 is 1 and Pos-edge signal 963 is 1, and a zero when ZC is 1 and Pos-edge is zero. In response to DBPC signal 964 and indication of a positive edge by Pos-edge signal 963, the PAL which implements the synchronous state machine including flip-flop 962 outputs a high (1) for digital data signal 913. Otherwise, digital data signal 913 is held low (0).

The derivation of DBPC signal 963 is shown, for example, in the synchronous state machine (SSM) logic diagram of FIG. 39. States A-F of the logic diagram shown in FIG. 39 are the same as similarly labelled states described with respect to the logic diagram shown in FIG. 37. The SSM enters state J from state F upon waiting for a predetermined pulse period. SSM cycles in state J until IE goes low, after which SSM returns to state A.

The DBPC signal 963 is output low in every state except F. In state F, DBPC signal 963 is output high for a predetermined output pulse period after which DBPC signal 963 drops low upon the SSM entering state J.

J. SOFTWARE IMPLEMENTATION

As previously mentioned, it is expected that various operational parameters of the present invention will be defined in software to adapt the scanning system for use in a range of specific applications. For example, the data rate of information transfer, or other interface parameters, as well as the types of symbologies to be decoded, are frequently determined by the user or by the scanning system manufacturer. However, specific scanning system models configured in accordance with the present invention will be operable with a larger variety of applications relative to conventional systems.

Sometimes it is also desirable to adjust or modify the electrical parameters or functions of the scanning system hardware to enable the system to perform in highly specialized applications better. To optimize the performance of a scanning system, such parameters as motor speed, amplifier gain, laser power amplifier bandwidth and digitizer thresholds may be adjusted and set at the time of manufacture or in accordance with previously incorporated U.S. Pat. Nos. 4,933,538, 4,808,804 and/or U.S. patent application Ser. No. 897,835 filed Jun. 12, 1992.

Unlike conventional systems, the present invention provides adjustable circuitry such that the adjustments mentioned above, and perhaps others, can be made under the control of a microprocessor. The same microprocessor used to decode symbols and/or interface with external equipment is preferably used for such adjustment operations, although a separate microcontroller may be employed. Such adjustments may be made during the manufacturing process to produce different scanning systems models having a predetermined range of operating parameters dedicated to the customer's use. Such adjustments may also be implemented by the customer at the time of installation, or at the beginning of a particular job. Such adjustments can also be made by the scanner automatically when placed in a "real-time adaptive" mode previously described.

The microprocessor can make various adjustments of optical and electrical parameters depending upon the accuracy and resolution needed. Examples of circuits that can be implemented in order to enable the microprocessor to make these adjustments are digital to analog convertors, digital and analog multipliers, digital potentiometers, analog switches, FETs and transistors.

K. CONCLUSION

The present invention provides a scanning system capable of adaptively altering the focus, output power, and pattern of a light beam directed at a barcode symbol. By so doing the scanning system provides a method and apparatus for tracking, scanning and decoding a barcode symbol attached to a moving object. The scanning system allows efficient alternative scanning of one- and two-dimensional barcode symbols. As a result, the scanning system offers improved barcode readability and user friendliness in a range of applications, including hand-held and fixed applications. The present invention also provides a scanning system having a multi-bit or single-bit digitizer capable of accurately defining a pulse-width modulated digital data signal corresponding to the spatial relationship of a scanned symbol even in noisy electrical environments.

It will be apparent to those skilled in the art that various modifications and variations can be made in the scanning system method and apparatus without departing form the scope or spirit on the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An adaptive scanning system, comprising:

scanning means, responsive to coordinate control signals, for directing a light beam in a pattern at a barcode symbol at a predetermined location, detecting a reflected portion of the light beam, and generating feedback signals corresponding to the detected portion of the reflected light beam;

processing means, responsive to the feedback signals, for generating pattern control signals, wherein the processing means generates a displacement signal as one of the pattern control signals; and pattern generator means for generating the coordinate control signals in responsive to the pattern control signals and for determining the light beam pattern, wherein the pattern generator means comprises:

means, responsive to the displacement signal and to the coordinate control signals, for translating the light beam pattern from the predetermined location to a new location.

2. The system of claim 1, wherein the pattern generator means further comprises:

means, responsive to the displacement signal and to the coordinate control signals, for rotating the light beam pattern.

3. The system of claim 2, wherein the displacement signal includes;

an angle of rotation component corresponding to a difference in an angular attitude of the light beam pattern, an X offset component corresponding to a difference between the predetermined location and the new location in a first direction, and a Y offset component corresponding to a difference between the predetermined location and the new location in a second direction;

wherein the coordinate control signals include an X coordinate control signal for controlling the light beam pattern in the first direction and a Y coordinate, signal for controlling the light beam pattern in a second direction, and wherein the means for translating and control rotating comprises:

means for generating a first and a second sinsusoidal function signal corresponding to the angle of rotation component;

first means, response to a first product of the X coordinate control signal and the first sinusoidal function signal, a second product of the Y coordinate control signal and the second sinusoidal function, and the X offset component, for generating a transformed X coordinate control signal;

second means, response to a third product of the X coordinate control signal and the second sinusoidal function signal, a fourth product of the Y coordinate control signal and the first sinusoidal function signal, and the Y offset component, for generating a transformed Y coordinate control signal; and wherein the scanning means is responsive to the transformed X and Y coordinate control signals, such that the light beam pattern is transtated from the predetermined location to a new location and rotated about the reference axis.

4. An adaptive scanning system, comprising:

scanning means, responsive to coordinate control signals, for directing a light beam in a pattern at a barcode symbol at a predetermined location, detecting a reflected portion of the light beam, and generating feedback signals corresponding to the detected portion of the reflected light beam;

processing means, responsive to the feedback signals, for generating pattern control signals; and pattern generator means for generating the coordinate control signals in responsive to the pattern control signals and for determining the light beam pattern, wherein the pattern control signals include a first, second and third oscillator control signals, and wherein the coordinate control signals include an X coordinate control signal for controlling the light beam pattern in a first direction, and a Y coordinate control signal for controlling the light beam pattern in a second direction;

wherein the pattern generator means comprises:

a first oscillator, responsive to the first oscillator control signals, for generating a first coordinate waveform signal;

a second oscillator, responsive to the second oscillator control signal, for generating a second coordinate waveform signal;

a third oscillator, responsive to the third oscillator control signal, for generating a third coordinate waveform signal;

first multiplier means, responsive to the first coordinate waveform signal and second coordinate waveform signal, for producing the X coordinate control signal; and second multiplier means, responsive to the second coordinate waveform signal, for producing the Y coordinate control signal.

5. The system of claim 4, wherein the third coordinate waveform signal is a sinusoidal signal, and wherein the pattern control signals include a first switch signal, a second switch signal, a third switch signal, a first waveform voltage, and a second waveform voltage;

the pattern generator further comprising:

a first switch, responsive to the first switch signal, for selecting between the second coordinate waveform signal and the first waveform voltage;

a second switch, responsive to the second switch signal, for selecting between the phase shifted second coordinate waveform and the second waveform voltage;

a third switch, responsive to the third switch signal, for selecting between a sine representation of the third coordinate waveform and a cosine representation of the third coordinate waveform signal;

wherein the first multiplier means is responsive to the first coordinate waveform signal and the selection of the first switch; and wherein the second multiplier means is responsive to the selection of the second switch and the selection of the third switch.

6. An adaptive symbol scanning system, comprising:

scanning means, responsive to first and second coordinate control signals having predetermined first and second amplitudes and predetermined first and second frequencies, for directing a light beam in a pattern at a symbol at a predetermined location, detecting a reflected portion of the light beam, and generating a feedback signal corresponding to the detected portion of the reflected light beam;

processing means, responsive to the feedback signal, for generating pattern control signals; and pattern generator means for varying a ratio of the first and second coordinate control signal amplitudes in response to the pattern control signals, and for varying a ratio of the first and second coordinate control signal frequencies in response to the pattern control signals thereby determining the light beam pattern.

7. An adaptive symbol scanning system, comprising:

scanning means, responsive to first and second coordinate control signals having predetermined first and second amplitudes and predetermined first and second frequencies, for directing a light beam in a pattern at a symbol at a predetermined location, detecting a reflected portion of the light beam, and generating a feedback signal corresponding to the detected portion of the reflected light beam;

processing means, responsive to the feedback signal, for generating pattern control signals and a displacement signal as one of the pattern control signals;

pattern generator means for varying a ratio of the first and second coordinate control signal amplitudes in response to the pattern control signals, and thereby determining the light beam pattern, the pattern generator means including means, responsive to the displacement signal and to the coordinate control signals, for translating the light beam pattern from the predetermined location to a new location.

8. The system of claim 7, wherein the pattern generator means further comprises:

means, responsive to the displacement signal and to the coordinate control signals, for rotating the light beam pattern.

9. A method of scanning symbols, comprising the steps of:

directing a light beam in a pattern at a symbol at a predetermined location;

detecting a reflected portion of the light beam;

generating a feedback signal corresponding to the reflected light beam portion;

generating a displacement signal in response to the feedback signal;

adaptively generating coordinate control signals in response to the feedback signal;

translating the light beam pattern from the predetermined location to a new location in response to the displacement signal and the coordinate control signals; and changing the light beam pattern in response to the coordinate control signals.

10. A method of scanning symbols, comprising the steps of:

directing a light beam in a pattern at a symbol at a predetermined location;

detecting a reflected portion of the light beam;

generating a feedback signal corresponding to the reflected light beam portion;

generating a displacement signal in response to the feedback signal;

adaptively generating coordinate control signals in response to the feedback signal;

translating the light beam pattern from the predetermined location to a new location and rotating the light beam pattern about a reference axis in response to the displacement signal and the coordinate control signals; and changing the light beam pattern in response to the coordinate control signals.

11. The method of claim 10, wherein the light beam pattern has a predetermined size at the predetermined location, the method further comprising the step of:

scaling the size of the light beam pattern in accordance with the feedback signal.

* * * * *